(12) United States Patent
Makris et al.

(10) Patent No.: US 10,448,152 B2
(45) Date of Patent: Oct. 15, 2019

(54) SYSTEMS AND METHODS FOR MONITORING AND CLASSIFYING MARINE ANIMALS BASED ON ACOUSTIC SIGNALS

(71) Applicant: Northeastern Univerisity, Boston, MA (US)

(72) Inventors: Purnima Ratilal Makris, Boston, MA (US); Nicholas Constantine Makris, Boston, MA (US)

(73) Assignee: Northeastern University, Boston, MA (US)

( * ) Notice: Subject to any disclaimer, the term of this patent is extended or adjusted under 35 U.S.C. 154(b) by 48 days.

(21) Appl. No.: 15/271,890

(22) Filed: Sep. 21, 2016

(65) Prior Publication Data

US 2017/0142515 A1    May 18, 2017

Related U.S. Application Data

(60) Provisional application No. 62/221,423, filed on Sep. 21, 2015.

(51) Int. Cl.
| | |
|---|---|
| H04R 1/44 | (2006.01) |
| G10L 25/51 | (2013.01) |
| H04R 3/00 | (2006.01) |
| G10L 17/26 | (2013.01) |
| H04R 1/26 | (2006.01) |
| H04R 29/00 | (2006.01) |

(52) U.S. Cl.
CPC ............... *H04R 1/44* (2013.01); *G10L 17/26* (2013.01); *G10L 25/51* (2013.01); *H04R 3/005* (2013.01); *H04R 1/265* (2013.01); *H04R 29/008* (2013.01); *H04R 2430/03* (2013.01); *H04R 2430/20* (2013.01)

(58) Field of Classification Search
CPC .......... H04R 1/44; H04R 3/005; H04R 1/265; H04R 29/008; H04R 2430/03; H04R 2430/20; G10L 17/26; G10L 25/51
See application file for complete search history.

(56) References Cited

U.S. PATENT DOCUMENTS

| | | | | |
|---|---|---|---|---|
| 4,509,151 | A * | 4/1985 | Anderson | G01V 1/38 367/118 |
| 9,625,592 | B2 * | 4/2017 | L'Her | G01V 1/001 |
| 2010/0067326 | A1 * | 3/2010 | Iranpour | G01V 1/3808 367/20 |
| 2016/0139245 | A1 * | 5/2016 | Forero | G01S 5/22 367/127 |
| 2017/0212255 | A1 * | 7/2017 | L'Her | G01V 1/001 |

* cited by examiner

*Primary Examiner* — Andrew L Sniezek

(57) ABSTRACT

Disclosed herein are apparatus, devices, and methods for monitoring marine animals, such as whales, and other marine mammals, and fish groups within a marine environment. A marine animal monitoring system may include an acoustic receiver array having a high-resolution directional sensing capacity using large-aperture densely-sampled coherent ocean acoustic receiver arrays operative to enhance detection range and localization accuracy of marine mammal vocalizations and fish acoustic signals. The acoustic receiver array may generate acoustic signal information based on acoustic signals sensed at the array. The marine monitoring system may operate to generate marine animal information based on the acoustic signal information, such as marine animal location, species, call type, and/or the like.

16 Claims, 21 Drawing Sheets

*Operating Environment 100*

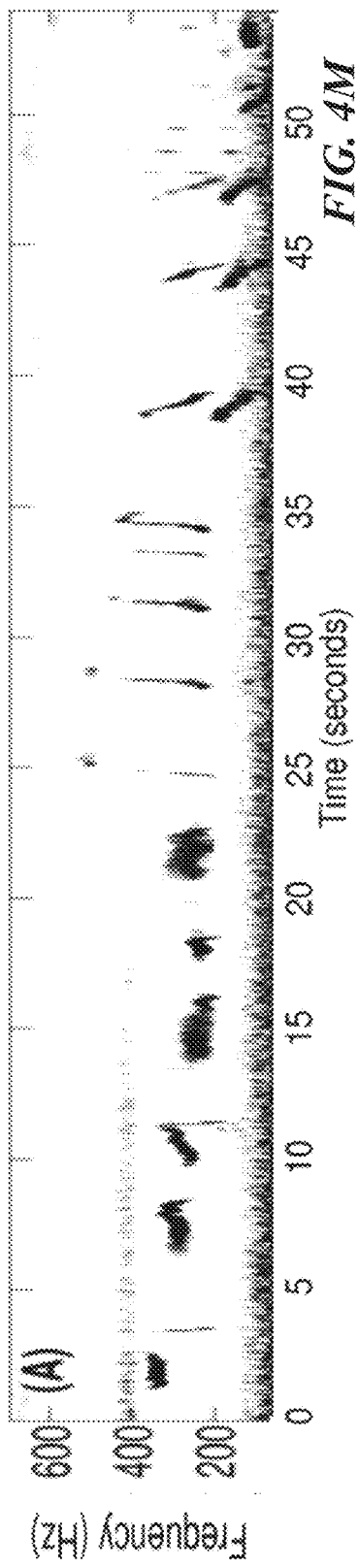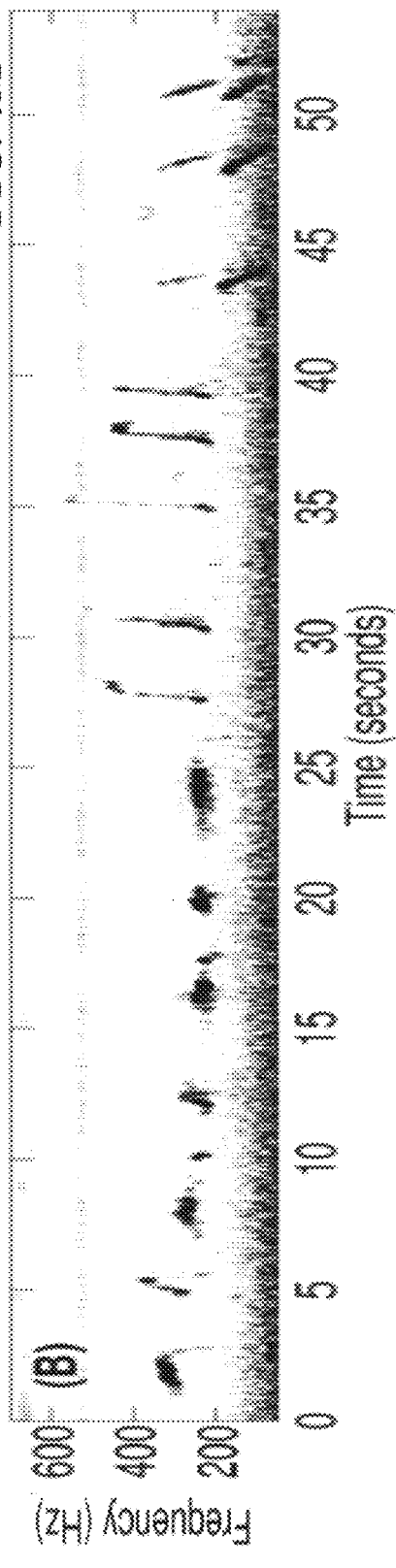
FIG. 4L
FIG. 4M

| Characteristics | fin | blue | sei (type 1) | sei (type 2) |
|---|---|---|---|---|
| $f_L$ (Hz) | $13.7 \pm 0.6$ | $28 \pm 3$ | $32 \pm 6$ | $22 \pm 3$ |
| $f_U$ (Hz) | $24.9 \pm 1$ | $56 \pm 8$ | $88 \pm 12$ | $36 \pm 4$ |
| $\overline{f}$ (Hz) | $19.8 \pm 0.4$ | $40 \pm 4$ | $50 \pm 7$ | $28 \pm 3$ |
| $\overline{B}$ (Hz) | $8 \pm 1$ | $12.5 \pm 4$ | $21 \pm 5$ | $8.1 \pm 1.5$ |
| $\overline{B}/\overline{f}$ | $0.40 \pm 0.05$ | $0.31 \pm 0.08$ | $0.4 \pm 0.1$ | $0.29 \pm 0.06$ |
| $\tau$ (s) | $0.8 \pm 0.2$ | $2 \pm 0.5$ | $2 \pm 0.5$ | $1 \pm 0.3$ |
| $\frac{df}{dt}$ (Hz/s) | $-4.6 \pm 2$ | $-9 \pm 5$ | $-24 \pm 10$ | $-6.6 \pm 3$ |
| $\frac{d^2f}{dt^2}$ (Hz/s$^2$) | $2.5 \pm 9$ | $0.5 \pm 6$ | $13 \pm 8$ | $5.6 \pm 8$ |

*FIG. 6*

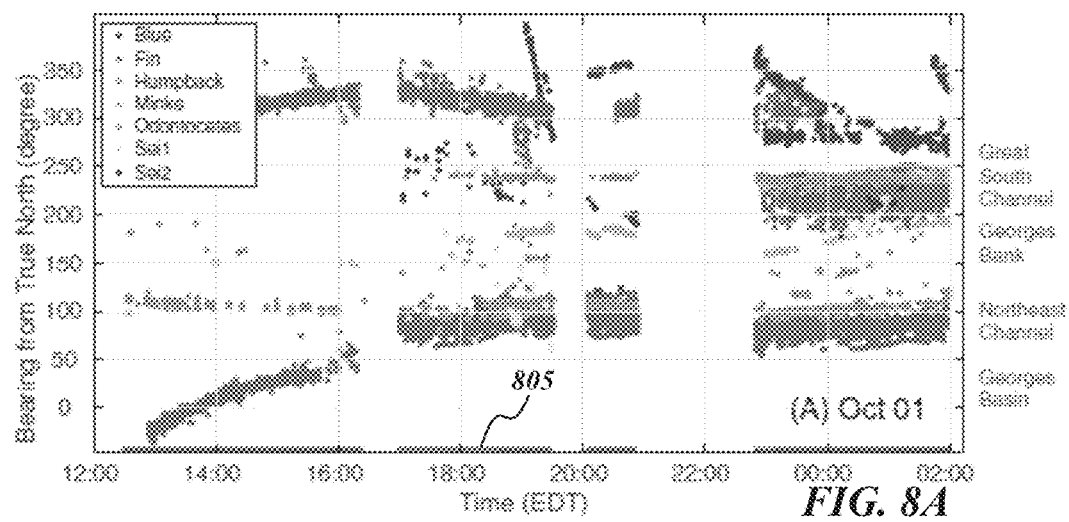
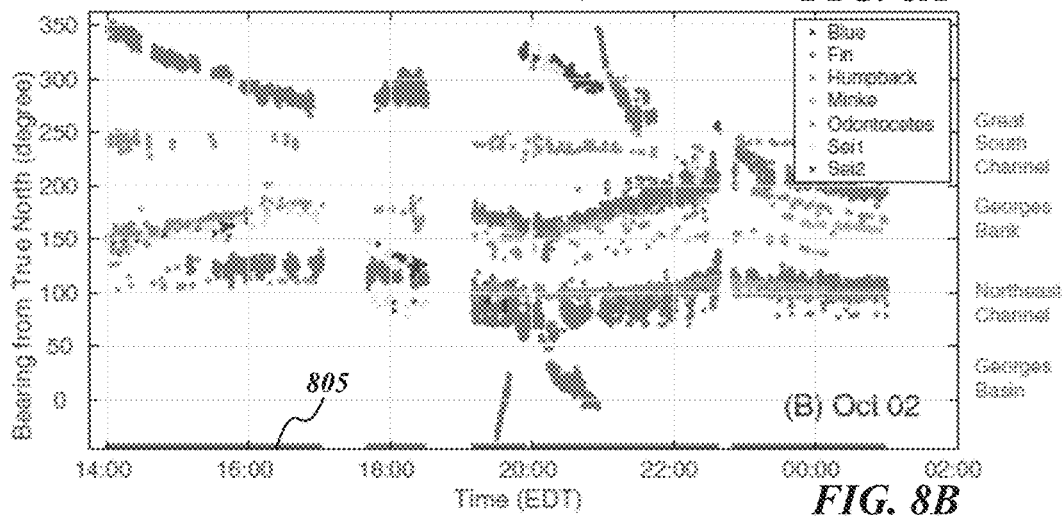
FIG. 8A
FIG. 8B

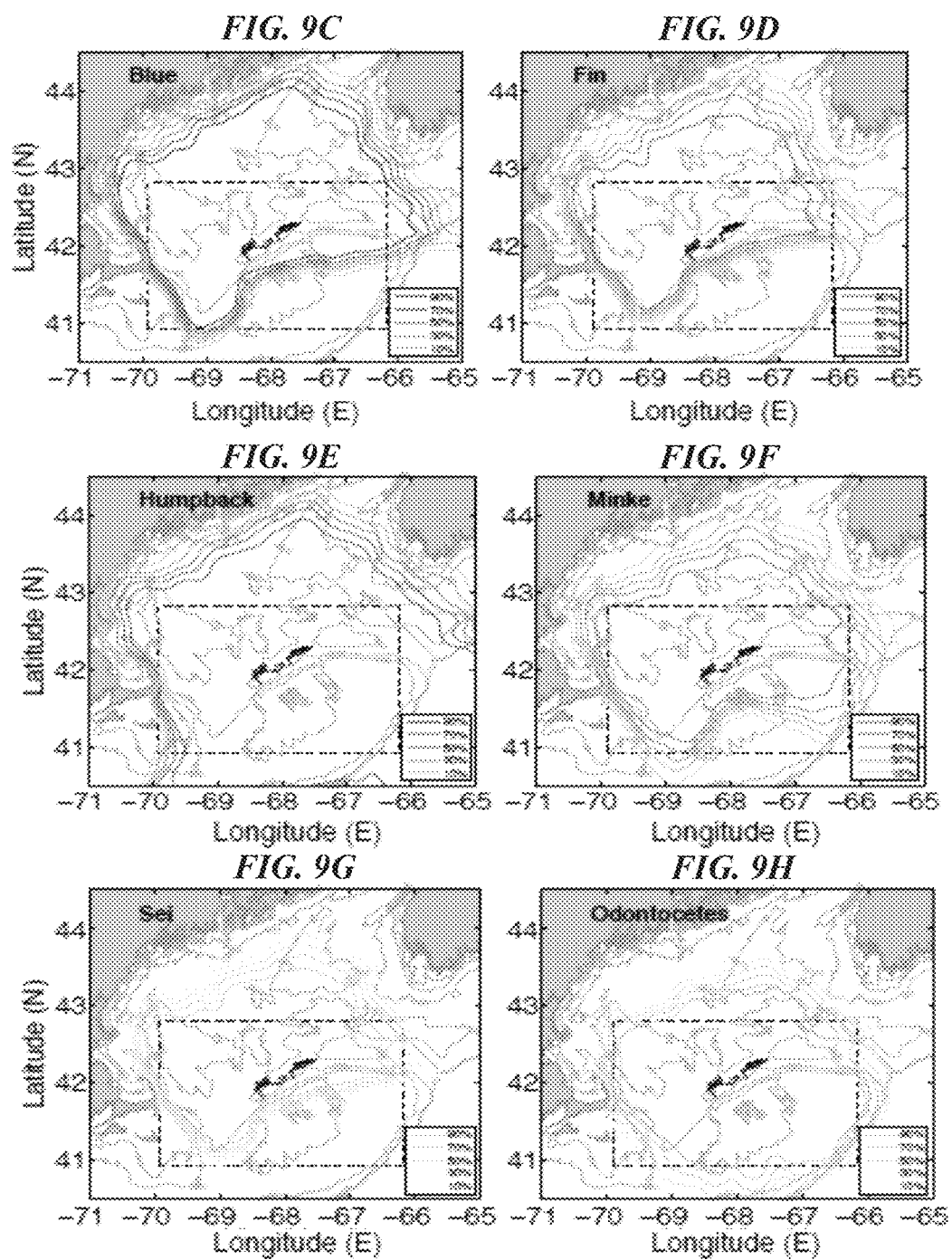

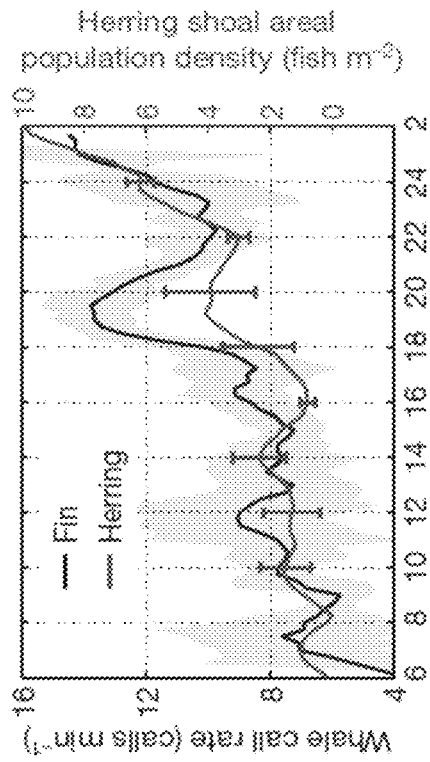
FIG. 11A
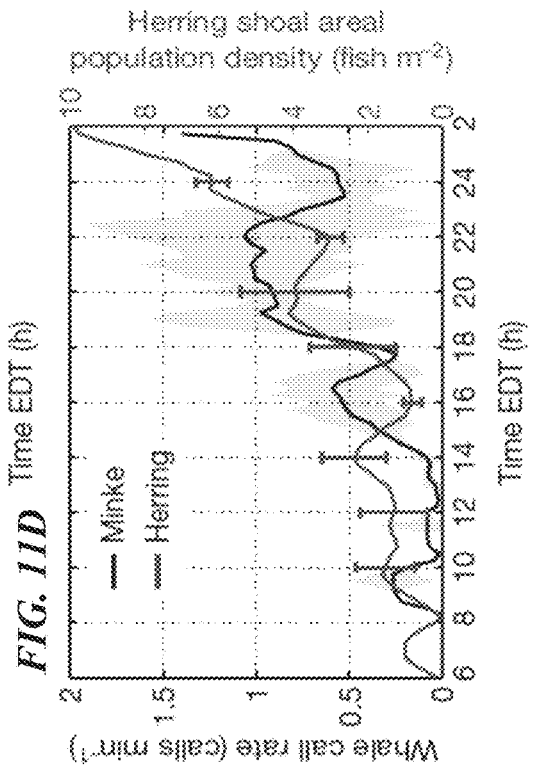
FIG. 11B
FIG. 11C
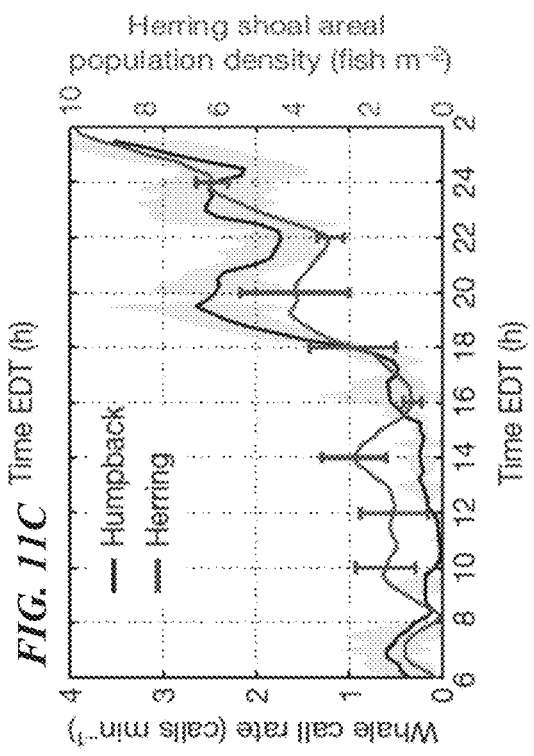
FIG. 11D

| MM species | $C_{MM}$ calls/day | $\frac{C_{MM,night}}{C_{MM,day}}$ | $r_{MM,fish}$ | $r_{MM_I,MM_{II}}$ ||||||
|---|---|---|---|---|---|---|---|---|---|
| | | | | blue | fin | humpback | minke | sei | odontocetes |
| blue | 470 | 10 | 0.91 | 1 | 0.67 | 0.78 | 0.48 | -0.17 | -0.46 |
| fin | 14,000 | 2.5 | 0.82 | 0.67 | 1 | 0.85 | 0.79 | 0.02 | -0.27 |
| humpback | 2,000 | 10 | 0.87 | 0.78 | 0.85 | 1 | 0.84 | -0.29 | -0.30 |
| minke | 690 | 5 | 0.64 | 0.48 | 0.79 | 0.84 | 1 | -0.18 | -0.20 |
| sei | 440 | 0.77 | -0.11 | -0.17 | 0.02 | -0.29 | -0.18 | 1 | 0.44 |
| odontocetes | 3200 | 0.83 | -0.42 | -0.46 | -0.27 | -0.30 | -0.20 | 0.44 | 1 |

*FIG. 12*

SYSTEMS AND METHODS FOR MONITORING AND CLASSIFYING MARINE ANIMALS BASED ON ACOUSTIC SIGNALS

CROSS-REFERENCE TO RELATED APPLICATION

This application claims the benefit of priority of 35 U.S.C. § 119(e) to U.S. Provisional Patent Application Ser. No. 62/221,423, filed on Sep. 21, 2015, which is incorporated by reference in its entirety as if fully set forth herein.

STATEMENT OF GOVERNMENT SUPPORT

This invention was made with government support under Grant Nos. N000140910814 and N000141410190 awarded by the Office of Naval Research, and Grant No. OCE-1136984 awarded by the National Science Foundation. The government has certain rights in the invention.

BACKGROUND

Marine animal monitoring has been performed to study populations of fish and marine mammals for academic research and commercial purposes. In addition, monitoring may be mandated for certain operations. For example, the Marine Mammal Protection Act (MMPA) of 1972, Amended 1994 requires marine mammal monitoring for operations that involve the transmission of acoustic or seismic signals, such as occurs in marine seismic and geophysical surveys and in sonar surveillance. Active detection methods generally consist of sending underwater signals and capturing the reflections of these signals from objects, such as marine animals. However, active detection methods are not preferred because the transmitted underwater signals may affect the behavior of the marine animals being surveyed and may have detrimental effects on marine animals and their environment. Passive detection systems involve monitoring visible and audible information of marine mammals without introducing signals into the environment.

Conventional passive monitoring systems operate using a single hydrophone or sparse hydrophone (for instance, two to four hydrophones) system elements to detect underwater acoustic signals and by positioning a group of observers (for instance, about four to six observers) using binoculars to visually detect marine mammals. The detection areas of such hydrophone systems are generally limited to about less than 100 square kilometers ($km^2$) in the immediate vicinity of a vessel towing the hydrophone system. Conventional monitoring systems are time consuming, experience frequent costly disruptions, and only provide small areal coverage relative to the bodies of water being surveyed. In addition, conventional monitoring systems are not reliable for monitoring many types of marine mammals, such as baleen whales. Accordingly, marine mammal monitoring operations would benefit from passive monitoring systems and techniques that are capable of efficiently and effectively monitoring larger areas while minimizing loss of survey time.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

In an embodiment, an apparatus for monitoring a plurality of marine animals may include an acoustic receiver array comprising a plurality of hydrophone elements in a coherent horizontal line-array arranged in a plurality of sub-apertures for spatially unaliased and temporally unaliased sensing of acoustic signals within a marine environment.

In an embodiment, a system for monitoring a plurality of marine animals may include at least one processor circuit and a memory unit coupled to the at least one processor circuit. The memory unit to store one or more programming instructions that, when executed, cause the processor to receive acoustic signal information from an acoustic receiver array comprising a plurality of hydrophone elements in a coherent horizontal line-array arranged in a plurality of sub-apertures for spatially unaliased and temporally unaliased sensing of acoustic signals within a marine environment, and transform the acoustic signal information into marine animal information

BRIEF DESCRIPTION OF THE DRAWINGS

FIGS. 4A-4M depict spectrograms of marine mammal vocalizations generated according to some embodiments.

FIG. 6 depicts whale vocalization characteristics detected according to some embodiments.

FIGS. 8A and 8B depict marine mammal vocalization bearings for diverse species measured according to some embodiments.

FIGS. 9C-9H depict probability of detection contours based on information generated via a marine animal monitoring system according to some embodiments.

FIGS. 11A-11D depict diel marine mammal call rate and herring shoal areal population density time series based on information generated according to some embodiments.

FIG. 12 depicts temporal connection information between marine mammals and fish shoaling populations based on information according to some embodiments.

DETAILED DESCRIPTION

Figure 1:
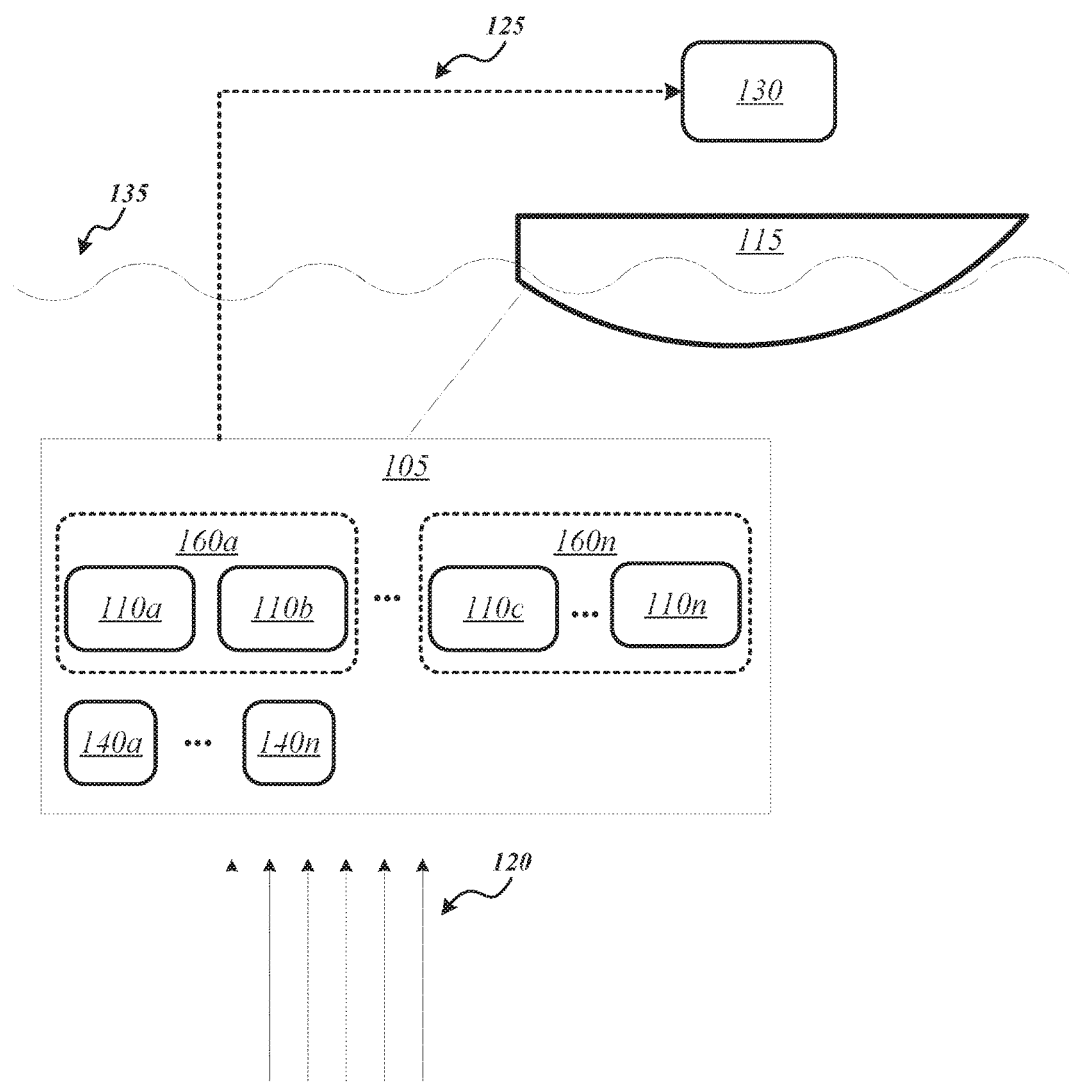
FIG. 1 illustrates an embodiment of a first operating environment for a marine animal monitoring system.

The described technology generally relates to a passive marine animal monitoring system operative to use passive acoustic sensing to measure acoustic signals of marine animals. In some embodiments, the marine animals may include marine mammals (or MM) and/or fish. In some embodiments, the marine mammals may include animals of the order Cetacea, for example, whales. In some embodiments, the acoustic signals from marine animals may include marine mammal vocalizations and/or acoustic signals generated by fish. In some embodiments, the marine animals may include fish groups. In some embodiments, the acoustic signals from marine animals may include sounds produced by fish The marine animal monitoring system may be configured to provide for the continuous monitoring of temporal-spatial distributions, behavior, and interactions of marine animals of diverse species over a large area of a body of water, for example, over a continental-shelf-scale area of water. In some embodiments, the marine animal monitoring system may include passive oceanic acoustic waveguide remote sensing (POAWRS). In various embodiments, the marine animal monitoring system may include an acoustic receiver array configured to receive acoustic signals from marine animals. In various embodiments, the acoustic receiver array may include a high-resolution directional sensing capacity having one or more large-aperture densely-sampled coherent ocean acoustic receiver arrays operative to enhance detection range and localization accuracy of marine mammal vocalizations. In some embodiments, the acoustic receiver array may include high-resolution directional sensing capacity of large-aperture densely-sampled acoustic receiver arrays via coherent beamforming configured to, among other things, enhance signal-to-noise ratio (SNR) by a factor of 10 to 200 times that of a single hydrophone, thereby significantly increasing the detection range and localization accuracy of marine animal acoustic signals. In some embodiments, the marine animal monitoring system may use certain geophysical environments of a survey area, such as continental shelves, islands, and/or the like as acoustic waveguides for long range propagation.

In some embodiments, the marine animal monitoring system may include techniques and processes to transform detected marine animal acoustic signals into marine animal information. Non-limiting examples of marine animal information may include species, vocalizations, bearing trajectories, time trajectories, bearing-time trajectories, geographic positioning, movement tracking, and/or the like. For example, a bearing-time trajectory of a sequence of marine mammal vocalizations may be transformed to provide geographic positioning and tracking of marine mammals updated at frequent time intervals, such as one minute intervals. In another example, the time-frequency characteristics of marine mammal vocalizations may be transformed into marine animal information that includes distinguishing, identifying, and/or otherwise classifying the marine mammals. In some embodiments, the time-frequency characteristics of marine mammal vocalizations and the bearing-time trajectories of a sequence of vocalizations may be transformed into marine animal information to geographically separate distinct marine mammal species and/or to assign newly discovered vocalizations to a given species.

In some embodiments, the marine animal monitoring system may operate to filter large-aperture densely-sampled coherent hydrophone array pressure-time series data in the frequency band of marine mammal vocalizations of interest, to perform vocalization detection via spectrogram analysis, thresholding, and/or clustering, and to use high-resolution beamforming to determine bearing of detected vocalizations. In various embodiments, the marine animal monitoring system may be configured to perform marine mammal vocalization feature extraction, for instance, via pitch tracking where features such as mean, maximum and minimum frequency, slope (for instance, in Hz per second), duration, and second and higher order curvature via polynomial curve fitting for each vocalization is determined. In some embodiments, the marine animal monitoring system may be operative to provide vocalization classification according to species, for instance, using vocalization clustering via k-means and/or Bayesian based Gaussian mixture models. In some embodiments, the marine animal monitoring system may provide vocalization bearing ambiguity resolution by association of vocalizations within array beam width over time and correlation to array heading.

In various embodiments, the marine animal monitoring system may localize a sequence of associated vocalizations from their bearing-time trajectories, for example, via moving array triangulation, waveguide array invariant, and bearing-only target motion analysis techniques. In some embodiments, the marine animal monitoring system may operate to perform geographic charting of localized marine mammal vocalizations, for instance, in latitude and longitude including bathymetric overlays for referencing. In various embodiments, the marine animal monitoring system may be configured to update detected marine mammal vocalization characteristics and measurement information into a database, for example, interfaced to a mySQL database management system that allows efficient and effective retrieval of specific marine mammal vocalization data. The marine animal monitoring system may be configured to determine temporal-spatial distributions of marine mammal vocalization rates for diverse species by averaging localized call rates for each species, for instance, over a predetermined averaging area and averaging period in a region of interest.

In some embodiments, the marine animal monitoring system may operate to distinguish and classify multiple vocalizing marine mammal\(for example sperm whales) individuals located in the far-field of a single, densely sampled, towed horizontal coherent hydrophone array system using the instantaneous sperm whale position estimates in both range and bearing, and the internal pulse interval (IPIs) of the vocalized click signals. For example, in some embodiments, estimates of the three-dimensional (3D) dive profiles of a sperm whale individual may be estimated based on detected vocalizations.

Observing marine animal populations continuously in time and space over the immense ocean areas they inhabit is challenging but essential for gathering an unambiguous record of their distribution, as well as understanding their behavior and interaction with prey species. The marine animal monitoring system configured according to some embodiments provides multiple technological advantages over conventional marine animal detection systems, for instance, by providing for the monitoring of marine animals over larger areas with more accurate, precise, and meaningful data than can be obtained using conventional methods. For example, conventional passive acoustic methods use a single hydrophone or a sparse network of single hydrophones to receive marine mammal vocalizations with significantly lower SNR and smaller detection ranges because, among other reasons, existing passive acoustic methods have no capacity for coherent beamforming. In another example, conventional single hydrophone or sparse hydrophone passive acoustic methods can only localize marine mammals in the near-field of the sensor configuration, for instance, within a one to two kilometer (km) range by triangulation or multipath reflection from ocean boundaries. The marine animal monitoring system configured according to some embodiments can localize marine mammals out to significantly longer ranges, for instance, on the order of 100 km, using the bearing-time trajectories of received marine mammal vocalizations. Conventional single hydrophone or sparse hydrophone passive acoustic methods have difficulties associating calls to distinct marine mammal groups, especially if the call volume is high, making it impossible to provide temporal-spatial distributions of multiple marine mammal groups. However, the marine animal monitoring system configured according to some embodiments may detect, localize, and classify vocalizing marine mammal species instantaneously over an approximately 100,000 km$^2$ region without aliasing in time and/or space.

FIG. 1 illustrates an embodiment of an operating environment 100 for a marine animal monitoring system. In some embodiments, an acoustic receiver array 105 may be arranged in a marine environment 135, for example, coupled to a receiver ship 115, such as a research vessel. In some embodiments, the receiver ship 115 may move or tow the acoustic receiver array 105 through the marine environment. The receiver ship 115 may move or tow the acoustic receiver array 105 at various speeds, including, without limitation 0.0 knots (kn) (or substantially 0.0 kn), 0.25 kn, 0.5 kn, 1.0 kn, 1.5 kn, 2 kn, 3 kn, 4 kn, 5 kn, or any value or range between any two of these values (including endpoints).

The marine environment 135 may include various bodies of water, including oceans, seas, bays, gulfs, sounds, banks, basins, lakes, and/or the like. The acoustic receiver array 105 may be configured to receive underwater acoustic signals 120 (for instance, acoustic sound waves). In particular, the acoustic receiver array 105 may be configured to detect acoustic signals 120 generated by marine animals such as fish and marine mammals. A non-limiting example of an acoustic signal generated by a marine animal may include marine mammal vocalizations. Marine mammals may include species of the order Cetacea, such as whales. Non-limiting examples of whales monitored by the marine animal monitoring system may include baleen whale species (*Mysticeti*), such as blue (*Balaenoptera musculus*), fin (*Balaenoptera physalus*), humpback (*Megaptera novaeangliae*), sei (*Balaenoptera borealis*) and minke (*Balaenoptera acutorostrata*), toothed whale species (*Odontoceti*), including sperm (*Physeter macrocephalus*), pilot (*Globicephala* spp.), orca (*Orcinus orca*), delphinid species, and/or the like. Although mammals, and whales in particular, are used as examples, embodiments are not so limited, as any marine animals capable of being monitored according to some embodiments are contemplated herein. Marine mammal vocalizations may include, without limitation, song calls, non-song calls, clicks, meows, cries, feeding cries, bow-shaped calls, and/or the like.

In some embodiments, the marine animal monitoring system may be configured to obtain acoustic signals 120 (for example, acoustic pressure) to generate acoustic signal information. In various embodiments, the acoustic signal information may be transformed into marine animal information relating to various characteristics of marine animals in the marine environment 135. Non-limiting examples of marine animal information may include location information, spatial information, bearing information, species information, population information, call type information, probability of detection information, call rate density information, fish population density, and/or the like. In some embodiments, the location information may include information relating to the location of one or more marine animals within the marine environment 135, such as a geographic location. In some embodiments, the location information may include a longitude and/or latitude value, a distance value (for example, from a known position), and/or the like. In some embodiments, the spatial information may indicate a location in space of a marine animal within the marine environment, such as a depth of a marine mammal in a body of water. In some embodiments, the bearings information may include the direction of motion of one or more marine animals. In some embodiments, species information may include species of marine animals generating the acoustic signals 120. In some embodiments, the call type information may include classifications of the acoustic signals 120 into different types of calls (for instance, song calls, non-song calls, and/or the like of marine mammals). In some embodiments, the probability of detection information may include the probability of one or more marine animals being within a certain area of a marine environment. Embodiments are not limited in this context.

In some embodiments, the acoustic receiver array 105 may be a receiver line array. In various embodiments, the acoustic receiver array 105 may include a plurality of hydrophone elements 110a-n. The acoustic receiver array 105 may be configured to detect, measure, monitor, or otherwise process acoustic signals 120 incident on the hydrophone elements 110a-n at various angles. In some embodiments, the hydrophone elements 110a-n may be arranged in one or more arrays. In some embodiments, the acoustic receiver array 105 (or each array of the acoustic receiver array) may include a plurality of hydrophone elements 110a-n to enable the direction of underwater acoustic signals to be determined. In some embodiments, the hydrophone elements 110a-n may be steered using various devices, for example, a beamformer (not shown). The hydrophone elements 110a-n may include various types of hydrophones, including, without limitation, omni-directional hydrophones, piezoelectric hydrophones, and/or the like. The acoustic receiver array 105 may include 2 hydrophone elements 110a-n, 3 hydrophone elements 110a-n, 4 hydrophone elements 110a-n, 5 hydrophone elements 110a-n, 6 hydrophone elements 110a-n, 7 hydrophone elements 110a-n, 8 hydrophone elements 110a-n, 9 hydrophone elements 110a-n, 10 hydrophone elements 110a-n, 15 hydrophone elements 110a-n, 20 hydrophone elements 110a-n, 25, hydrophone elements 110a-n, 30 hydrophone elements 110a-n, 40 hydrophone elements 110a-n, 50 hydrophone elements 110a-n, 100 hydrophone elements 110a-n, 150 hydrophone elements 110a-n, 160 hydrophone elements 110a-n, 175 hydrophone elements 110a-n, 200 hydrophone elements 110a-n, 250 hydrophone elements 110a-n, 300 hydrophone elements, or any value or range between any two of these values (including endpoints). In an embodiment, the acoustic receiver array 105 may include 160 hydrophone elements 110a-n.

In some embodiments, the marine animal monitoring system may include various sensors 140a-n. In some embodiments, at least a portion of the sensors 140a-n may be arranged on the acoustic receiver array 105. Non-limiting examples of sensors may include light sensors, pressure sensors, temperature sensors, location sensors (for instance, GPS sensors), depth sensors, speed sensors, array heading sensors, compasses, and/or the like.

In some embodiments, the hydrophone elements 110*a-n* may be nested. In some embodiments, the hydrophone elements 110*a-n* may be nested into one or more subapertures 160*a-n*. For example, an acoustic receiver array 105 may include 160 hydrophone elements 110*a-n* nested into 1 subaperture, 2 subapertures, 3 subapertures, 4 subapertures, 5 subapertures, 10 subapertures, 20 subapertures, or any value or range between any two of these values (including endpoints). In some embodiments, the acoustic receiver array 105 may include 160 hydrophone elements 110*a-n* nested into 4 subapertures 160*a-n*. In some embodiments, the acoustic receiver array 105 may include 160 hydrophone elements nested into 4 subapertures 160*a-n* each including 64 hydrophones. Embodiments are not limited in this context.

The hydrophones may have various frequency ranges, such as a range of less than 50 Hz to 3750 Hz. In some embodiments, the acoustic receiver array 105 may be configured for sensing acoustic signals 120 having various frequencies. For example, the acoustic receiver array 105 may operate to sense acoustic signals 120 having a frequency of 1 Hz, 10 Hz, 50 Hz, 100 Hz, 500 Hz, 1 kHz, 2 kHz, 2.5 kHz, 3 kHz, 4 kHz, 5 kHz, 6 kHz, 7 kHz, 8 kHz, 9 kHz, 10 kHz, 15 kHz, 20 kHz, or any value or range between any two of these values (including endpoints). In some embodiments, the acoustic receiver array 105 may be configured for sensing acoustic signals 120 of 4 kHz. In some embodiments, the acoustic receiver array 105 may be configured for sensing acoustic signals 120 of 8 kHz. In some embodiments, the acoustic receiver array 105 may be configured for sensing acoustic signals 120 of 4 kHz (with a sampling rate of 8 kHz).

In some embodiments, the acoustic receiver array 150 may include a plurality of linear apertures. In some embodiments, the acoustic receiver array 150 may include a low-frequency (LF) aperture, a mid-frequency (MF) aperture, and a high-frequency (HF) aperture. In some embodiments, the acoustic receiver array 150 may include an LF aperture and a MF aperture, both consisting of 64 equally-spaced hydrophones with respective inter-element spacing of 1.5 meters (m) and 0.75 m. The receiver array 150 in the embodiment having an LF aperture and an MF aperture may be configured to have a fundamental frequency of about 1000 Hz to below about 1000 Hz to analyze marine mammal vocalizations (for instance, humpback whale calls). For marine mammal vocalizations below about 500 Hz, the LF aperture may be used, while for marine mammal vocalizations with a frequency content extending beyond about 500 Hz to about 1 kHz, the MF may be used.

In some embodiments, the angular resolution $B(\phi, f_c)$ of the receiver array (for instance, a horizontal receiver array) may be $B(\phi, f_c) \approx 1/44(\lambda/L \cos \phi)$ for broadside (for instance, $\phi=0$ through angles near endfire ($\phi=\pi/2$), where $\lambda=c/f_c$ is the acoustic wavelength, c is the sound speed, $f_c$ is the center frequency, and L is the array aperture length. At endfire, the angular resolution may be $B(\phi=\pi/2, f_c) \approx 1/44\sqrt{\lambda/L}$.

The acoustic receiver array 105 may be configured to provide information, data, or other signals to a computing system 130 in wired or wireless communication with the acoustic receiver array. Illustrative and non-restrictive examples of a computing system 130 may include, without limitation, a network, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, a mobile device, a mobile computing device, a smart phone, appliances, and/or combinations thereof. The embodiments are not limited in this context. The computing system 130 may operate to store information and perform functions and processes according to some embodiments described herein. For instance, the computing system 130 may be configured to receive acoustic signal information and to transform the acoustic signal information into marine animal information.

Figure 2:
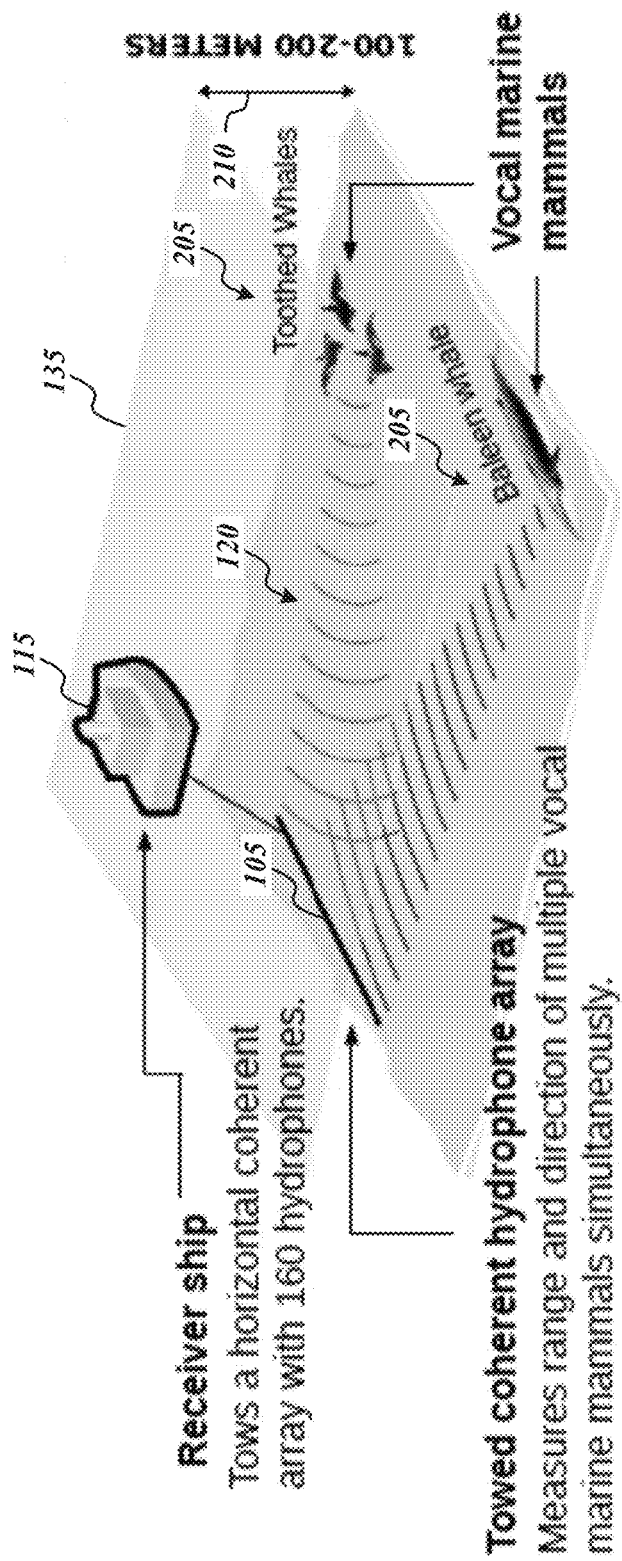
FIG. 2 illustrates an embodiment of a second operating environment for a marine animal monitoring system.

FIG. 2 illustrates an embodiment of an operating environment 200 for a marine animal monitoring system. As shown in FIG. 2, a receiver ship 115 may be coupled to an acoustic receiver array 105 arranged within a marine environment 135. In some embodiments, the acoustic receiver array 105 may be arranged as one or more horizontal arrays of hydrophones. In some embodiments, the acoustic receiver array 105 may be arranged as one or more three-dimensional (3D) arrays of hydrophones. In some embodiments, the acoustic receiver array 105 may be arranged as a vertical array of hydrophones. In some embodiments, at least a portion of the hydrophones may be arranged in a horizontal orientation and at least another portion of the hydrophones may be arranged in a vertical orientation. For example, the acoustic receiver array 105 may be arranged as a horizontal coherent array of 160 hydrophones. In some embodiments, the acoustic receiver array 105 may be configured to receive acoustic signals 120 to measure range and direction of multiple vocal marine mammals 205 simultaneously, such as toothed whales and/or baleen whales. The acoustic receiver array 105 may be arranged at various depths, for example, 25 meters (m), 50 m, 100 m, 150 m, 200 m, 300 m, 400 m, 500 m, 1000 m, or any value or range between any two of these values (including endpoints). In some embodiments, the marine animal monitoring system may be configured to monitor marine animal acoustic signals 120 over various areas, including areas of about 5,000 $km^2$, 10,000 $km^2$, 20,000 $km^2$, 50,000 $km^2$, 100,000 $km^2$, 150,000 $km^2$, 200,000 $km^2$, or any value or range between any two of these values (including endpoints).

Figures 3A, 3B:
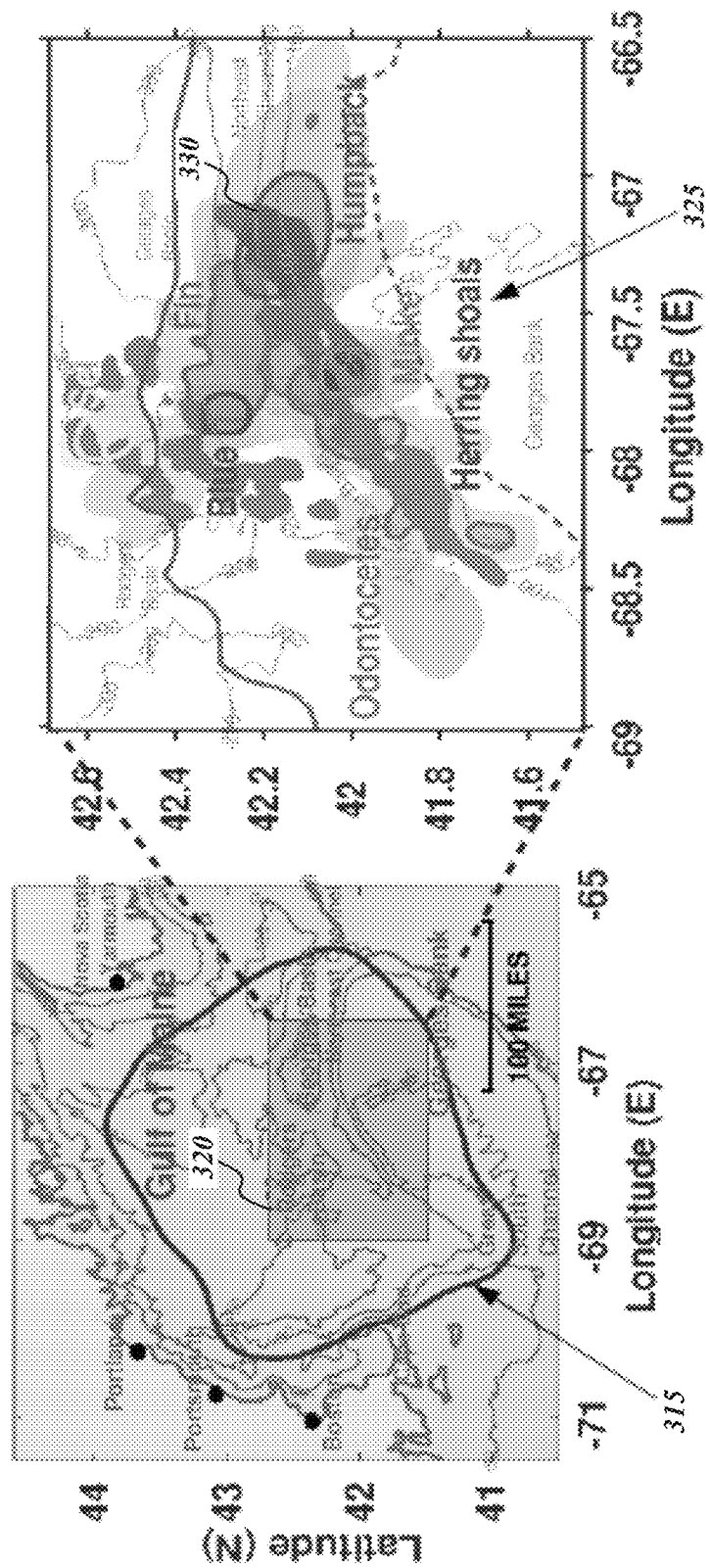
FIGS. 3A-3G depict whale species vocalization based on acoustic signals measured according to some embodiments.
Figure 3C:
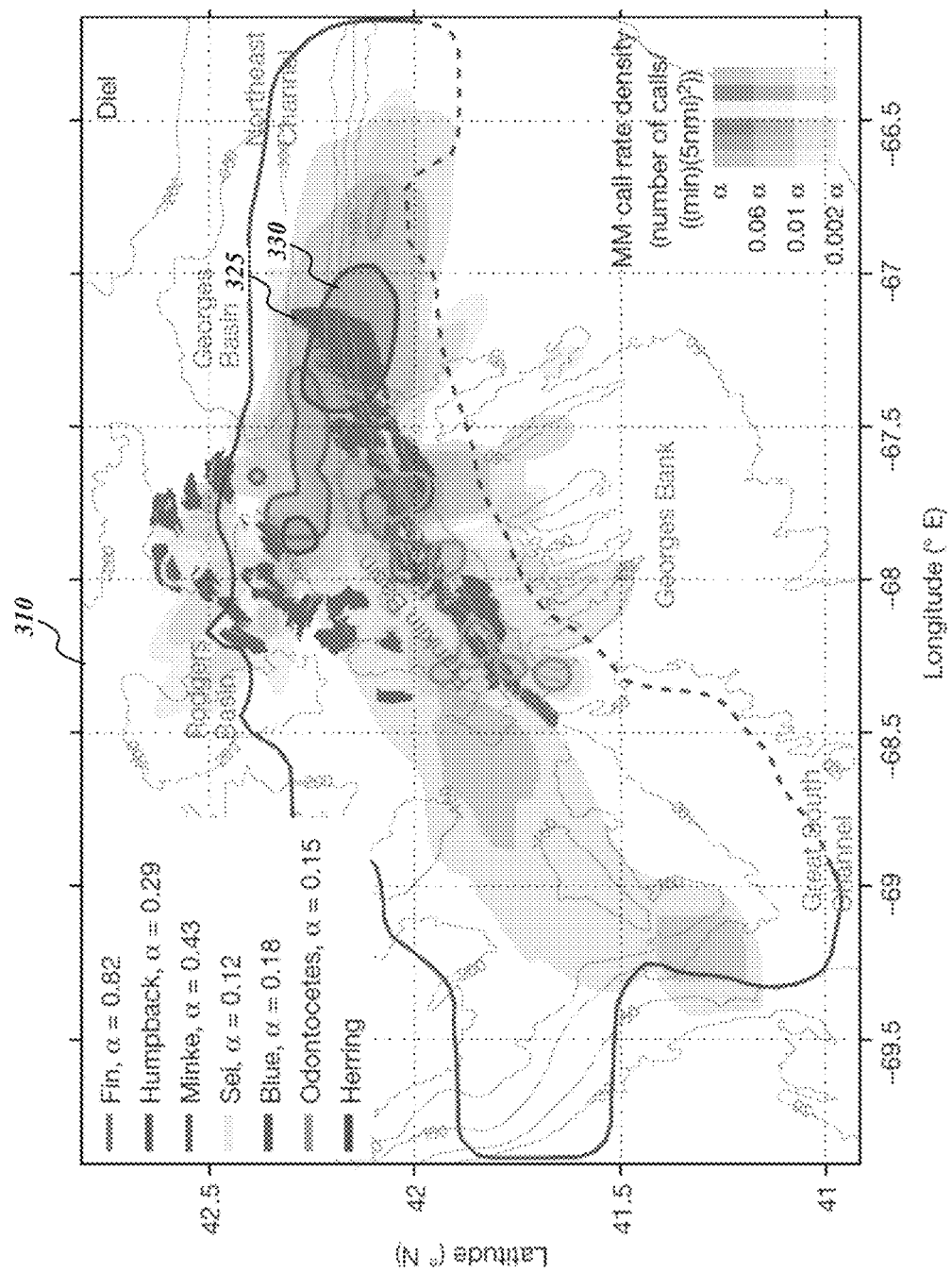

FIGS. 3A and 3B depict whale species vocalization areas of an illustrative marine environment measured using methods and systems configured according to some embodiments. The marine monitoring system according to some embodiments may be configured to obtain acoustic signal information and to generate marine animal information, including information to localize and image marine mammal vocalizations and fish populations (for instance, marine mammal prey species such as Atlantic herring (*Clupea harengus*)) over thousands of square miles of a marine environment (for instance, the Gulf of Maine as depicted in FIGS. 3A-3E). In this manner, the marine animal monitoring system is capable of detecting marine animal movements and relationships (for instance, the marine mammal population movements corresponding with the movements of their prey, the Atlantic herring). As shown in FIG. 3A, a marine animal monitoring system may be configured to detect acoustic signals within a marine environment 30, for example, within a detection region boundary 315. FIG. 3B provides a detail of area 320 of the detection region boundary 315. FIG. 3C depicts the same or substantially the same marine animal information depicted in FIG. 3B with corresponding legends for the depicted data.

Figure 3D:
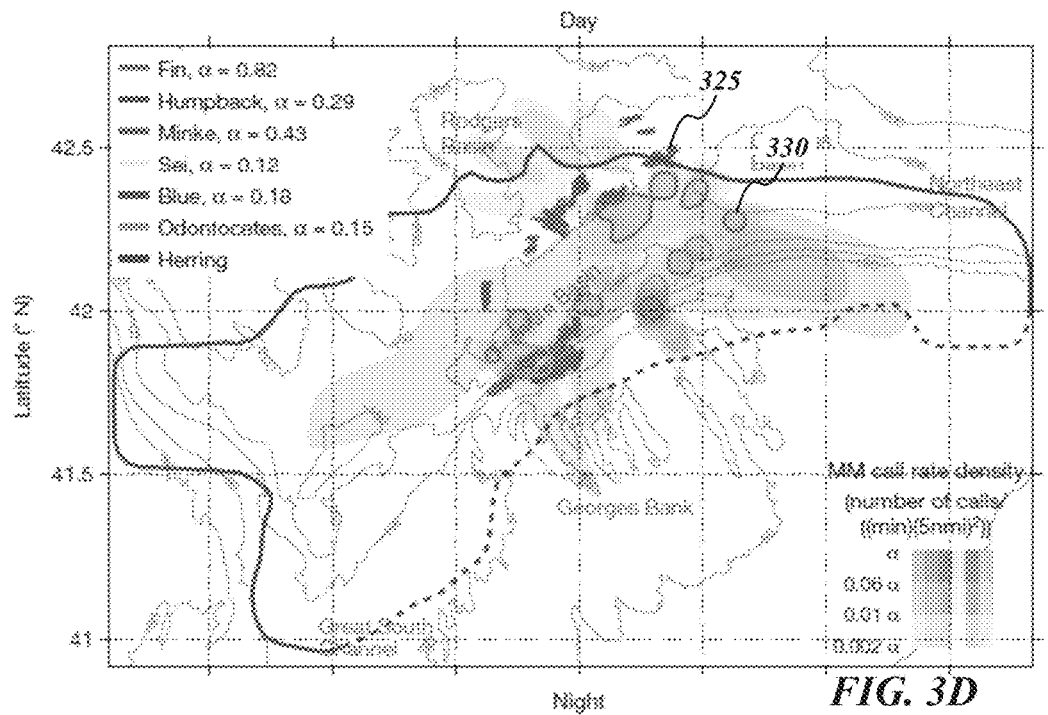
Figure 3E:
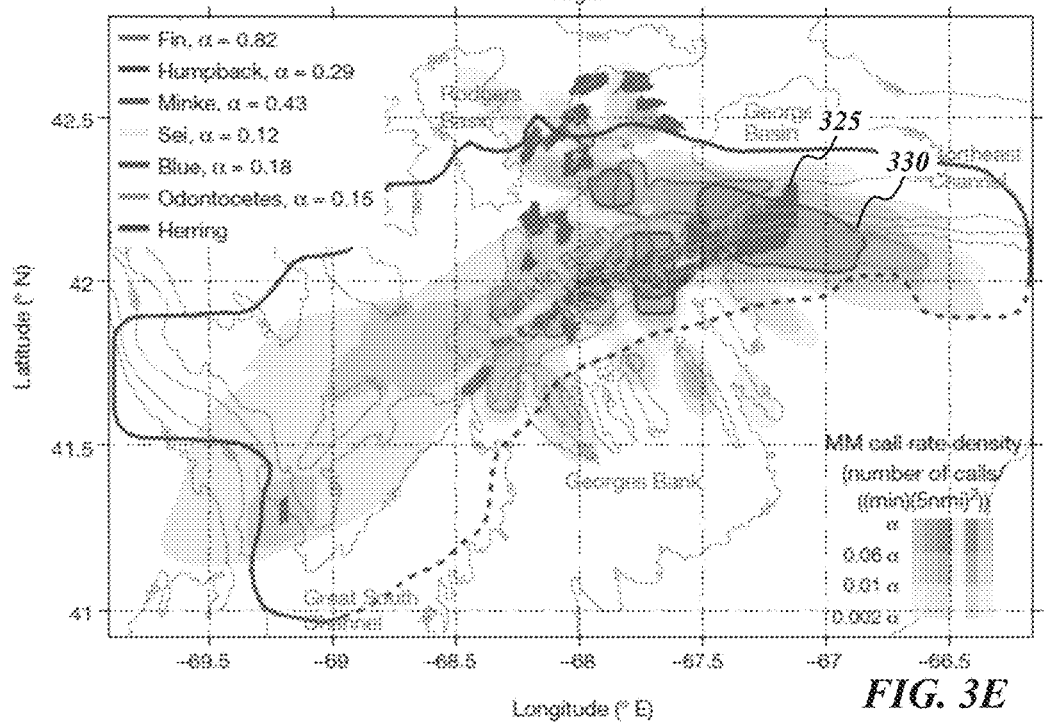
Figures 3F, 3G:
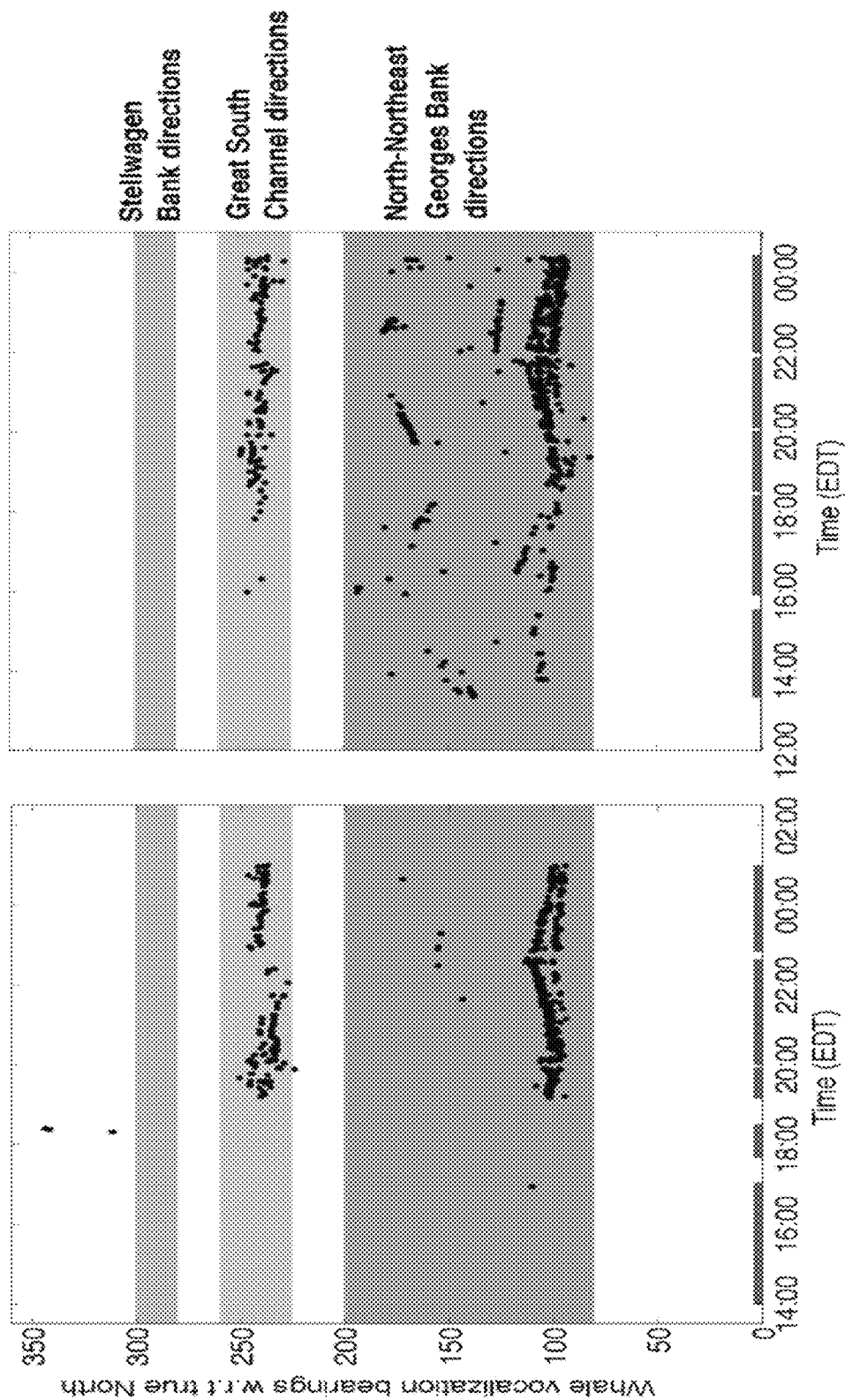

FIGS. 3D and 3E depict day and night distributions of marine mammal vocalizations and herring, respectively. In some embodiments, the marine animal monitoring system may use various techniques to obtain data relating to fish. In some embodiments, the marine animal monitoring system may use a different technique for fish than for obtaining marine mammal vocalizations. For instance, fish distributions may be acquired using ocean acoustic waveguide imaging (OAWRS). In some embodiments, the marine animal monitoring system may use the same or substantially the same acoustic receiver array for fish sounds (or fish acoustic signals) and for marine mammal vocalizations. The fish distributions may be acquired simultaneous with or substantially simultaneously with the acquisition of marine mammal vocalization data, for instance, using passive techniques according to some embodiments. FIGS. 3F and 3G depict vocalizing humpback whale bearings areas within the illustrative marine environment depicted in FIGS. 3A-3E measured using methods and systems configured according to some embodiments.

As shown in FIG. 3C, the marine animal monitoring system may be configured to detect fish shoals 325 and whale species vocalization areas (or "hotspots") 330. Although multiple whale species are depicted in graph FIG. 3C (for instance, within the circled regions), only one is labeled to simplify the figure. For example, FIG. 3C may depict vocalizing marine mammals from diverse species convergent on spawning herring distributions within a marine environment, such as the Gulf of Maine. In some embodiments, the dense herring shoals may have greater than 0.2 fish per square meter ($m^2$) imaged using an OAWRS system and diffuse herring populations (for example, about 0.053 fish per $m^2$) bounded by line 345 may be obtained using sonar. The marine mammal call rate depicted in graph 310 may have densities in units of numbers of calls per minute per $nmi^2$ (for example $(min)(5\ nmi)^2$) measured using a marine animal monitoring system according to some embodiments (for instance, a POAWRS configured according to some embodiments) having peak values of a.

Figure 4A:
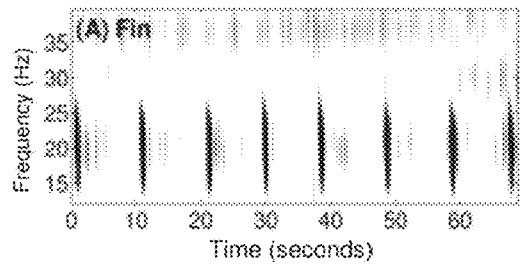
Figure 4B:
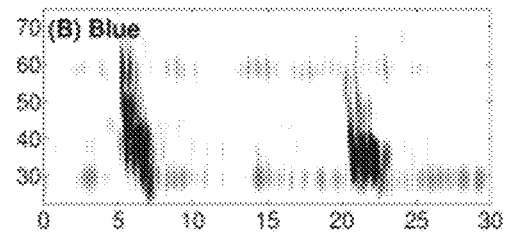
Figure 4C:
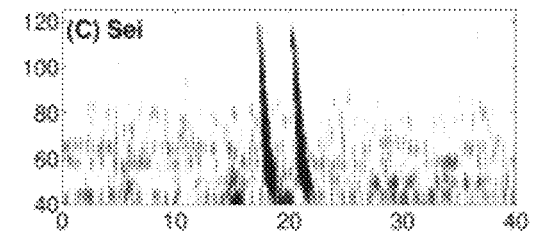
Figure 4D:
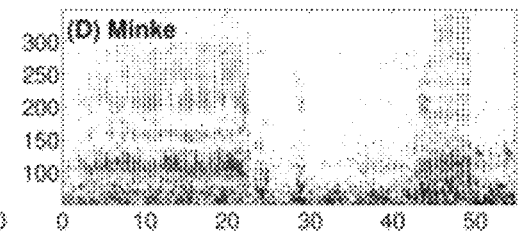
Figure 4E:
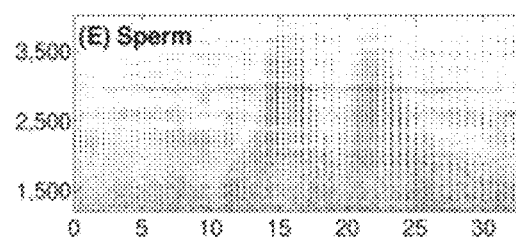
Figure 4F:
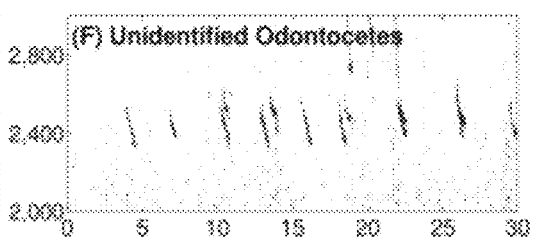
Figure 4G:
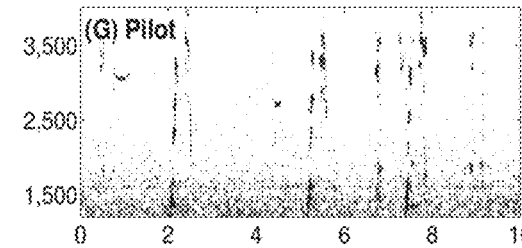
Figure 4H:
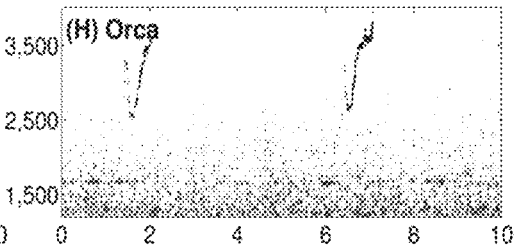
Figure 4I:
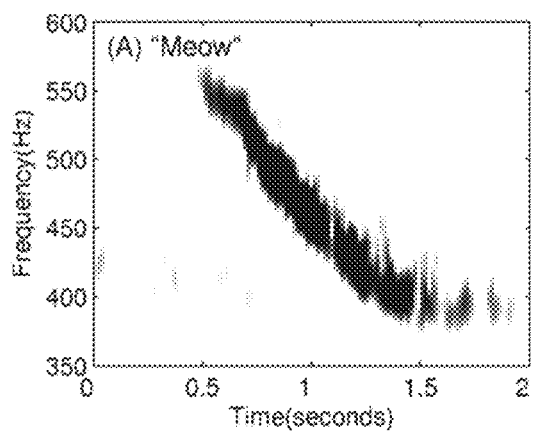
Figure 4J:
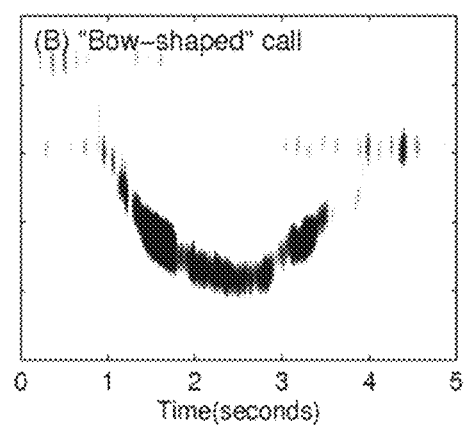
Figure 4K:
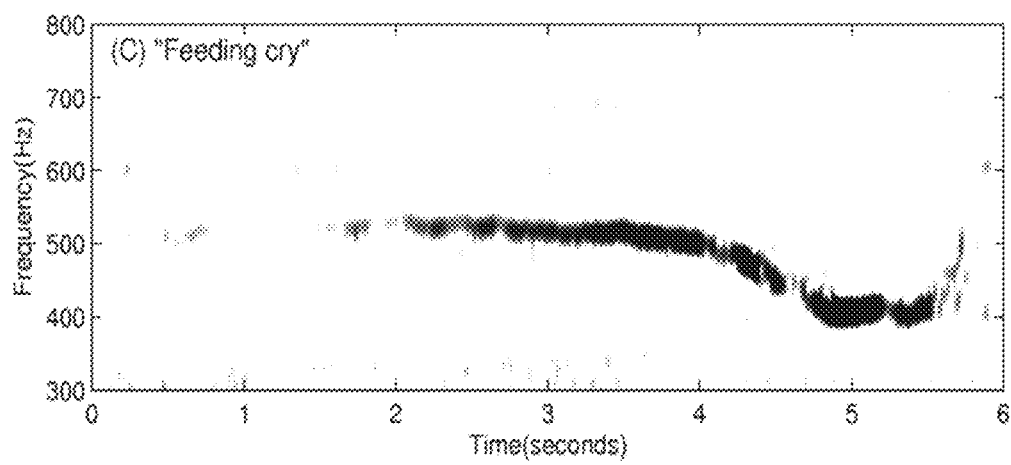

FIGS. 4A-4M depicts spectrograms of marine mammal vocalizations detected and generated according to some embodiments. The acoustic signal information sensed by the marine animal monitoring system may be transformed according to some embodiments into one or more acoustic pressure-time series converted to two-dimensional (2D) beam-time series by time-domain beamforming. In some embodiments, the 2D beam-time series may be converted, or further converted, to spectrograms ("beamformed" spectrograms), for instance, using Fourier transform. In various embodiments, marine mammal vocalizations may be extracted using a threshold detector. In some embodiments, the threshold detector may operate with a greater-than 5.6 decibels (dB) signal-to-noise-ratio (SNR). In some embodiments, the threshold detector may have a detection rate of about 87%±5%, depending on, for example, the species, call characteristics, and in-beam ambient noise levels. Accordingly, in some embodiments, the marine animal monitoring system may transform acoustic signals into spectrograms of marine animal sounds (for example, fish sounds or marine mammal vocalizations). In some embodiments, the spectrograms may be analyzed to determine a species (for instance, species information) that is the source of the acoustic signals and/or a type of acoustic signal (for example, call type information). For example, FIGS. 4I-4K may depict a "meow" call, a "bow-shaped" call, and a "feeding cry" call, respectively, of a marine mammal, such as a humpback whale. In various embodiments, the marine animal monitoring system may be configured to analyze a spectrogram generated based on acoustic signals according to some embodiments, and to classify which species has made the call and/or the type of call based on call characteristic information. For instance, the call characteristic information may indicate that a humpback whale may have a non-song call of a repetitive downsweep "meow" that includes approximately a 1.44 second duration, 452 Hz center frequency, 170 Hz bandwidth, and a 31 second repetition rate. Accordingly, the marine animal monitoring system may analyze the spectrogram of an acoustic signal to determine the species that is the source of the acoustic signal and the type of call associated with the acoustic signal. Embodiments are not limited in this context.

In some embodiments, the beamformed spectrograms may be checked using various additional techniques, such as manual detection. Accordingly, using a marine animal monitoring system having a densely sampled, large-aperture array configured according to some embodiments, the marine animal monitoring system may track multiple vocalizing marine mammals (for instance, humpback whales) in beam-time. In some embodiments, the marine animal monitoring system may transform the acoustic signal information into marine animal information in the form of location information, for instance, to determine a horizontal location of a marine mammal (for instance, a vocalizing humpback whale), both bearing and range need to be estimated. Bearings of vocalized marine mammals may be determined using the acoustic receiver array, for example, configured as a densely sampled, large-aperture horizontal receiver array, by time-domain beamforming. Synthetic aperture tracking and an array invariant method may be applied to determine the range of vocalizing marine mammals from the horizontal receiver array center. The synthetic aperture tracking technique may operate to form a synthetic array by combining a series of spatially separated finite apertures of a single towed acoustic receiver array line-array. The array invariant method may provide instantaneous source range estimation by exploiting the multi-modal arrival structure of guided wave propagation at the acoustic receiver array in a dispersive ocean waveguide.

Position estimation error, or the root mean squared (RMS) distance between the actual and estimated location, is a combination of range and bearing errors. Range estimation error, for instance, the percentage of the range from the source location to the horizontal receiver array center, for the synthetic aperture tracking technique may be about 2% at array broadside and gradually increases to 10% at 65° from broadside and 25% at 90° from broadside (for instance, near or at endfire). Range estimation error for the array invariant method may be about 4-8% over all azimuthal directions. Bearing estimation error of the time domain beamformer may be about 0.5° at broadside and gradually increases to 6.0° at endfire.

In some embodiments, the acoustic signal information may be transformed into marine animal information in the form of animal density information. For instance, the measured source locations for all vocalizations may be used to generate marine animal density maps, such as depicted in FIGS. 3A-3E. In some embodiments, the source location of each call may be characterized by a 2D Gaussian probability density function with mean equal to the measured mean position from synthetic aperture tracking or the array invariant method and standard deviations determined by the measured range and bearing standard deviations. The range standard deviation is 2% for sources located at and near array broadside and increases to 25% for sources located at and near array endfire, based on the range errors of both synthetic aperture tracking and the array invariant method.

The bearing standard deviation is 0.5° for sources located at or near array broadside and increases to 6.0° for sources located at or near array endfire. A marine mammal call rate density map may determined by superposition of the 2D spatial probability densities for the source location of each call, normalized by the total measurement time. Left-right ambiguity in determining the bearing of a sequence of source signals may be resolved by changing the array's heading during the reception of the sequence of source transmissions, following the standard method for resolving left-right ambiguity in source bearing for line array measurements in the ocean.

For a far-field point source in free space, bearing ambiguity in line array measurements exists in a conical surface about the array's axis with cone angle equal to the bearing of the source with respect to the array's axis, because the phase speed on the array is identical for far-field sources on this cone at any given frequency. When ambiguity is restricted to source locations in the marine environment, only two ambiguous bearings remain, left and right in the horizontal plane about the array's axis, for example, for ranges large compared to the water depth of the source and receiver. To resolve this ambiguity, array heading is varied by an amount $\Delta\theta$ with respect to an absolute coordinate system during the sequence of source transmissions. The true location of the source in absolute coordinates is independent of the array heading, but the bearing of the virtual image source has a component that moves by $2\Delta\theta$ with the array heading. This is analogous to the case where a mirror is rotated by $\Delta\theta$, and the true source remains at an absolute position independent of the mirror's orientation but its virtual image in the mirror rotates by an apparent $2\Delta\theta$ with the mirror's rotation to maintain a specular angle with respect to the mirror's plane and satisfy Snell's Law. In some embodiments, the criterion used to distinguish the virtual image bearing from the true source bearing involves robustly resolving ambiguity by moving the array heading by an angular amount $\Delta\theta$ such that the change in virtual bearing $2\Delta\theta$ exceeds the array's angular resolution scale (for example, the array beamwidth) in the direction of the detected source (for instance, a "Rayleigh-resolved" change). This Rayleigh resolved change in bearing of the virtual source of $2\Delta\theta$ with the array's heading change of $\Delta\theta$ is used to identify the virtual source and distinguish it from the true source, which has an absolute bearing independent of $\Delta\theta$. In some embodiments, a process for ambiguity resolution with the Rayleigh criterion may be applied to one or more sequences of source transmissions used for source localization.

Figure 5A:
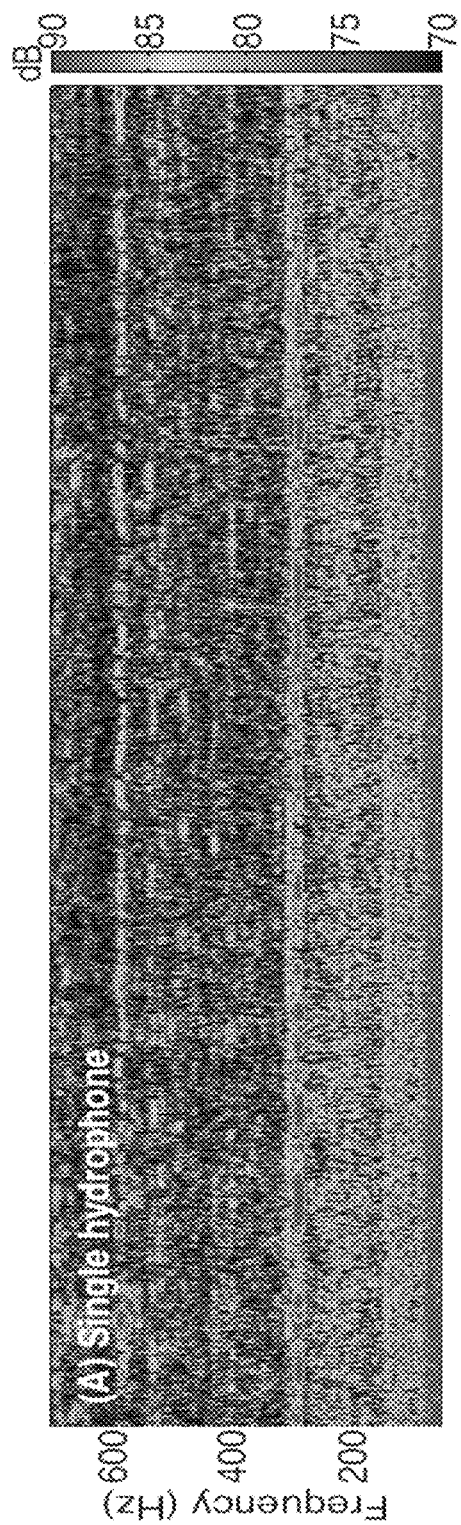
FIGS. 5A and 5B depict spectrograms of marine mammal vocalizations generated according to a conventional system and according to some embodiments.
Figure 5B:
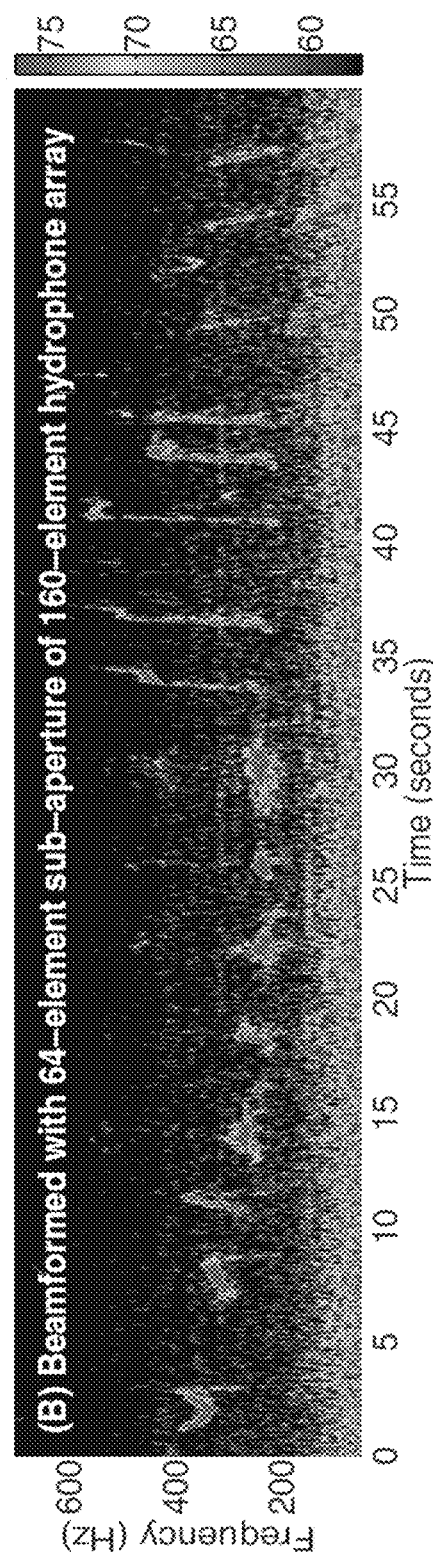

FIGS. 5A and 5B depict spectrograms of marine mammal acoustic information. More specifically, FIG. 5A depicts a spectrogram produced from information detected using a conventional system using a single hydrophone. FIG. 5B depicts a spectrograph produced from information detected using an acoustic receiver array configured according to some embodiments, for example, with a 64-element sub-aperture of a POAWRS 160-element hydrophone array. The spectrogram of graph 510 depicts song vocalization of a humpback whale individual about 35 km away from the POAWRS receiver enhanced by 18 dB above background noise after beamforming where the whale is about 64.16° from the array broadside. In various embodiments, the acoustic receiver array 105 may be configured to have a high gain, for example, up to $10 \log_{10} n=18$ dB, where $n=64$ hydrophones for each sub-aperture. In some embodiments, operation of the acoustic receiver array 105 may enable detection of marine mammal (for example, whale) vocalizations two orders of magnitude more distant in range or lower in SNR than a conventional single hydrophone, for example, with no array gain. In some embodiments, the angular resolution of the acoustic receiver array 105 may be dependent on the measured bearing, array aperture length, and/or acoustic wavelength.

Figure 7B:
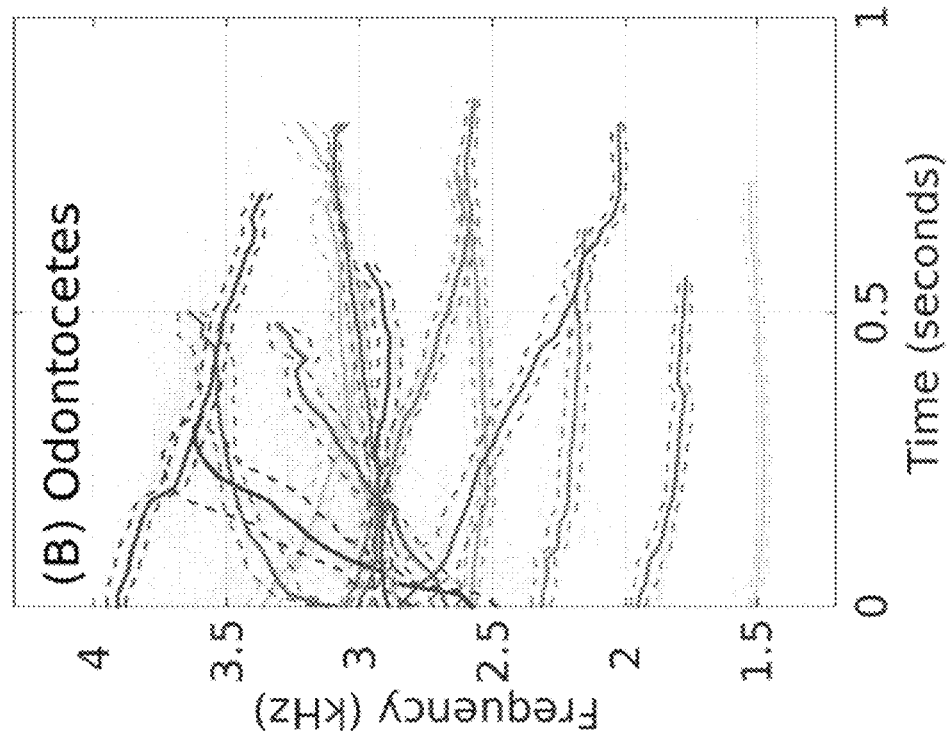
FIGS. 7A and 7B depict graphs of pitch-tracks of repetitive whale vocalizations detected according to some embodiments.
Figure 7A:
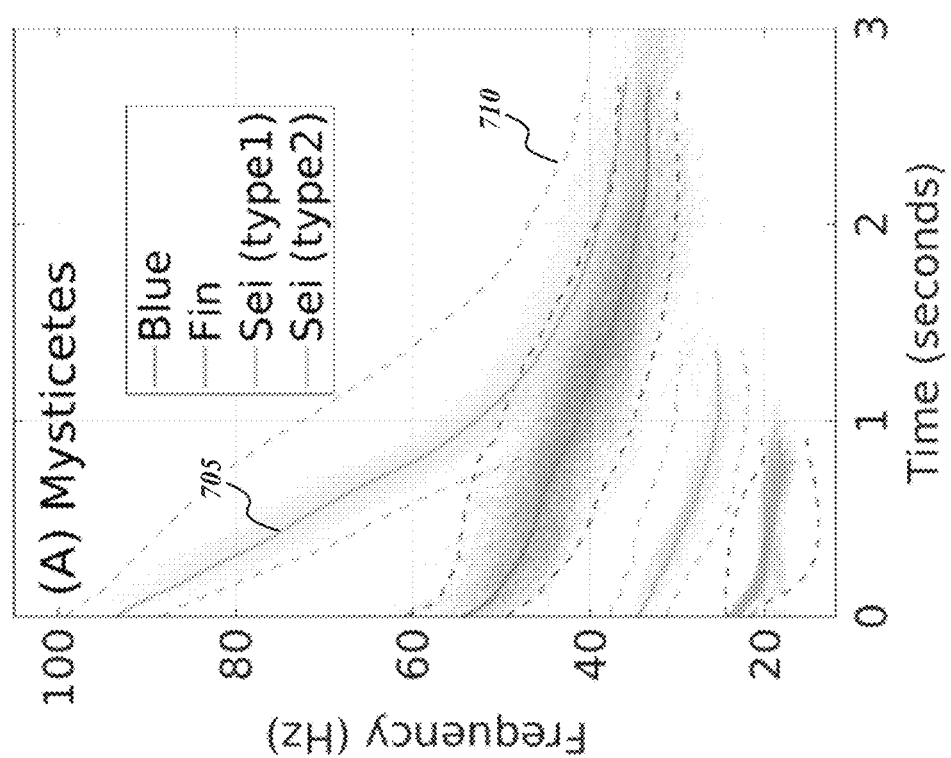

FIG. 6 depicts vocalization characteristics for baleen whales (for example, large baleen whales) detected using an acoustic receiver array configured according to some embodiments. The characteristics depicted in FIG. 6 include lower frequencies $f_L$, upper frequencies $f_U$, mean frequencies $\bar{f}$, mean instantaneous bandwidth $\bar{B}$, relative instantaneous bandwidth $\bar{B}/\bar{f}$, duration, slope $df/d\tau$, and curvature $d^2f/d\tau^2$. In some embodiments, slope and curvature may be obtained from second nonlinear curve-fit to the vocalization traces obtained via pitch-tracking according to some embodiments. FIGS. 7A and 7B depicts graphs of pitch-tracks of repetitive whale vocalizations. In particular, FIG. 7A depicts pitch-tracks of repetitive mysticetes vocalizations in the 10 Hz to 100 Hz range. FIG. 7B depicts pitch-tracks of repetitive odontocete vocalizations in the 1 kHz to 4 Hz range. The thick solid curves 705 are the means of about 500 to 1,000 vocalizations of each type. Mean instantaneous bandwidth of the pitch tracks 710 are indicted by the dashed curves. Although multiple means and mean instantaneous bandwidths are depicted in FIGS. 7A and 7b, only one is labeled to simplify the figure. Even though blue and sei type I calls have some overlapping bandwidth, they can be well separated using the upper frequency and slope features (for example, as depicted in FIG. 6). In some embodiments, a combination of extracted features, orthogonalized via principle component analysis (PCA), may be used to optimize the vocalization species classification employing k-means and Bayesian-based Gaussian mixture model clustering approaches. The bearing-time trajectories of each associated series of vocalizations may be taken into account, for example, to ensure consistent classification, and to minimize the automatic classification error (for instance, between 0.5% to 7% depending on the species).

The acoustic signals of marine animals may be identified based on various characteristics, for example, to generate marine animal information such as species information. For example, in a low frequency range from 10 Hz to 100 Hz, the acoustic spectra were dominated by fin, blue and sei vocalizations. The fins were identified from their characteristic 20 Hz center frequency calls that have been associated with communication among fin individuals and also have been found to be uttered by males as breeding displays in their mating grounds. Given the large volume of fin vocalizations measured here in the vicinity of dense shoaling fish populations, averaging 14,000 calls per day, these 20 Hz calls can also be associated with feeding behavior, serving as communication signals or for coordination among individuals in their foraging ground. The blues were identified from their audible downsweeps (for instance, type D calls, burps and grunts), previously found to be vocalized by both sexes, regarded as contact or social calls produced by individuals at shallow depths of 10-40 m. The seis were identified from their downsweep calls occurring singly or as doublets with roughly four second separation, and also sometimes as triplets, for example, as potential long-range contact calls possibly enabling coordinated activities such as feeding or breeding.

The spectra in a mid-frequency range from 100 Hz to 1,000 Hz were dominated by minke and humpback vocalizations. The minkes were identified from their buzzes comprised of a series of high and low frequency click sequences, which has characteristics similar to the highly repetitive pulse train of odontocetes that may be suitable for prey echolocation. Compared to other baleen whales, the humpbacks have a fairly extensive vocalization repertoire. The humpbacks were identified from their songs as well as non-song calls. Male humpbacks vocalize songs which are patterned sequences of calls as breeding displays in their mating ground, and have been observed to carry the tunes into their feeding grounds. The non-song vocalizations detected include 'feeding cries' similar to those observed in Alaskan humpback cooperative group feeding on herring schools, as well as 'bow-shaped' calls and 'meows' suited for night time communication among humpback individuals and coordination during group feeding activities.

The spectra at frequencies higher than 1 kHz were dominated by odontocete vocalizations. They consist of sperm whale slow and usual click, and creak sequences, pilot and killer whale whistles, as well as a wide range of repetitive sequences of downsweep chirp signals roughly 0.7 second duration with varying bandwidths between 200 to 1,000 Hz, all occurring above 1 kHz that can be attributed to pilot or killer whales, or a variety of other delphinid species. The highly repetitive click sequences used for prey echolocation occur at frequencies higher than 10 kHz for many odontocete species. The largest of the odontocete species, the sperm whale, has slow and usual click and creak sequences with significant energy as low as 1 kHz. The whistles and wide variety of downsweep chirp signals we recorded in the frequency range of odontocete vocalizations may serve as contact calls between individuals and to facilitate cohesion during foraging or travel.

FIGS. 8A and 8B depict marine mammal vocalization bearings for diverse species measured by an acoustic receiver array configured according to some embodiments, for example, in a marine environment depicted in FIGS. 3A and 3B. More specifically, FIGS. 8A and 8B depict graphs of the bearing-time trajectories of vocalizations from multiple marine mammal species received by the acoustic receiver array. For humpbacks, the alternation from song to non-song calls in their vocalization repertoire over several diel cycles are plotted as a function of bearing-time trajectory in FIGS. 8A and 8B as a comparison. With reference to FIGS. 3A and 3B, the bearing ranges from 100° to 240° from true north for an acoustic receiver array spanning Georges Bank from east to west respectively. In some embodiments, the diel vocalization rate (for example, calls per minute) time series shown in FIGS. 8A and 8B for each marine mammal species may be obtained by averaging the daily vocalization rate time series for that species over the time period. The marine mammal vocalization rate time series, initially calculated in 15 minute bins, may be averaged over a 1.25 hour running window corresponding to the half power width quantifying the temporal correlation scale of the fish shoaling density time series. For both minke and odontocete whale click sequences, since the duration of each click sequence is highly variable from a few seconds to over a minute, the call rates shown in FIGS. 8A and 8B may represent the number of 5 second intervals that contain click sequences. In some embodiments, the bearings may be measured from true north in a clockwise direction with respect to instantaneous spatial locations of an acoustic receiver array center. Bars 805 indicate operation time periods for the acoustic receiver array. Although multiple bars are depicted in FIGS. 8A and 8B, only one is labeled to simplify the figure.

In some embodiments, the horizontal location of each marine mammal vocalization may include a range and/or a bearing estimate. In various embodiments, the moving array triangulation (MAT) and the array invariant (AI) methods may be applied to determine a range of vocalizations from a horizontal acoustic receiver array center of an acoustic receiver array configured according to some embodiments. Position estimation error, or the root mean squared (RMS) distance between the actual and estimated location, may include a combination of range and bearing errors quantified for an acoustic receiver array. Range estimation error, expressed as the percentage of the range from the source location to the horizontal receiver array center, for the MAT technique may be about 2% at array broadside and may gradually increase to 10% at 65° from broadside and 25% at 90° from broadside, that is, near or at endfire. Range estimation error for the AI method may be about 4% to 8% over all azimuthal directions. Bearing estimation error of the time domain beamformer may be about 0.5° at broadside and may gradually increase to 6.0° at endfire. Such errors may be determined based on absolute global positioning system (GPS) ground truth measurements of the source array's position. More than 80% of vocalizing marine mammal may be found to be located between 0° to 65° from the broadside direction of the horizontal acoustic receiver array. In some embodiments, position estimation error may be less than 2 km for a majority of the vocalizing marine mammals, for example, associated with the data of FIGS. 3A-3E, since they are found within roughly 50 km of the horizontal acoustic receiver array center. Such errors may be over an order of magnitude smaller than the spatial scales of the marine mammal concentrations, for example, shown in FIGS. 3B-3E and, consequently, may have negligible influence on the analyses.

In some embodiments, the estimated locations of marine mammal calls over the duration of information collected to generate the call density maps for each marine mammal species as depicted in FIGS. 3A-3E may be characterized by a 2D Gaussian probability density function with mean equal to the measured mean position from MAT or the AI method and standard deviations determined by the measured range and bearing standard deviations. The marine mammal call rate density map for each species may be determined by the superposition of the 2D spatial probability densities for the location of each call, normalized by the total measurement time.

Figure 9A:
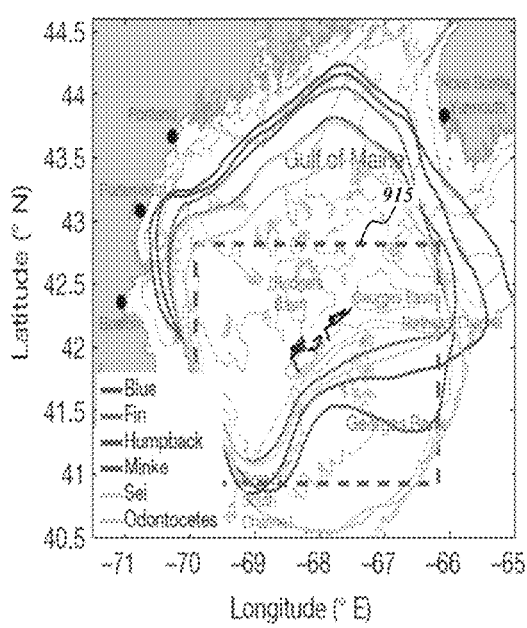
FIGS. 9A and 9B depict a marine mammal detection region and cumulative nocturnal marine mammal call rate distribution based on information generated according to some embodiments.
Figure 9B:
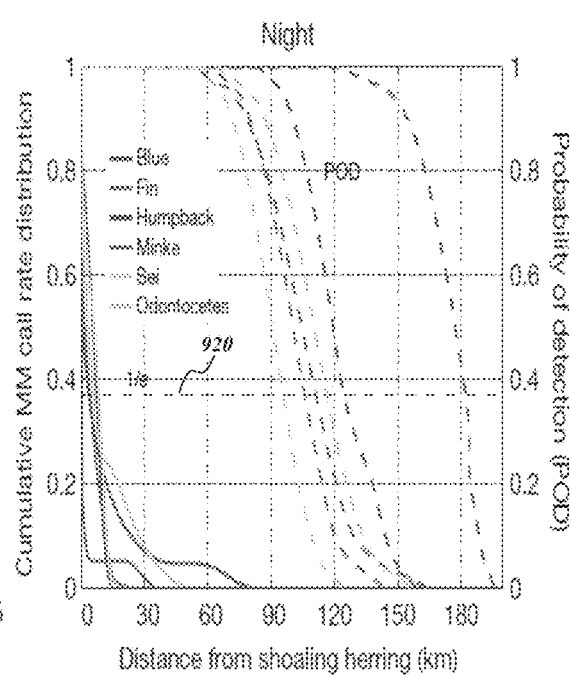
Figure 10:
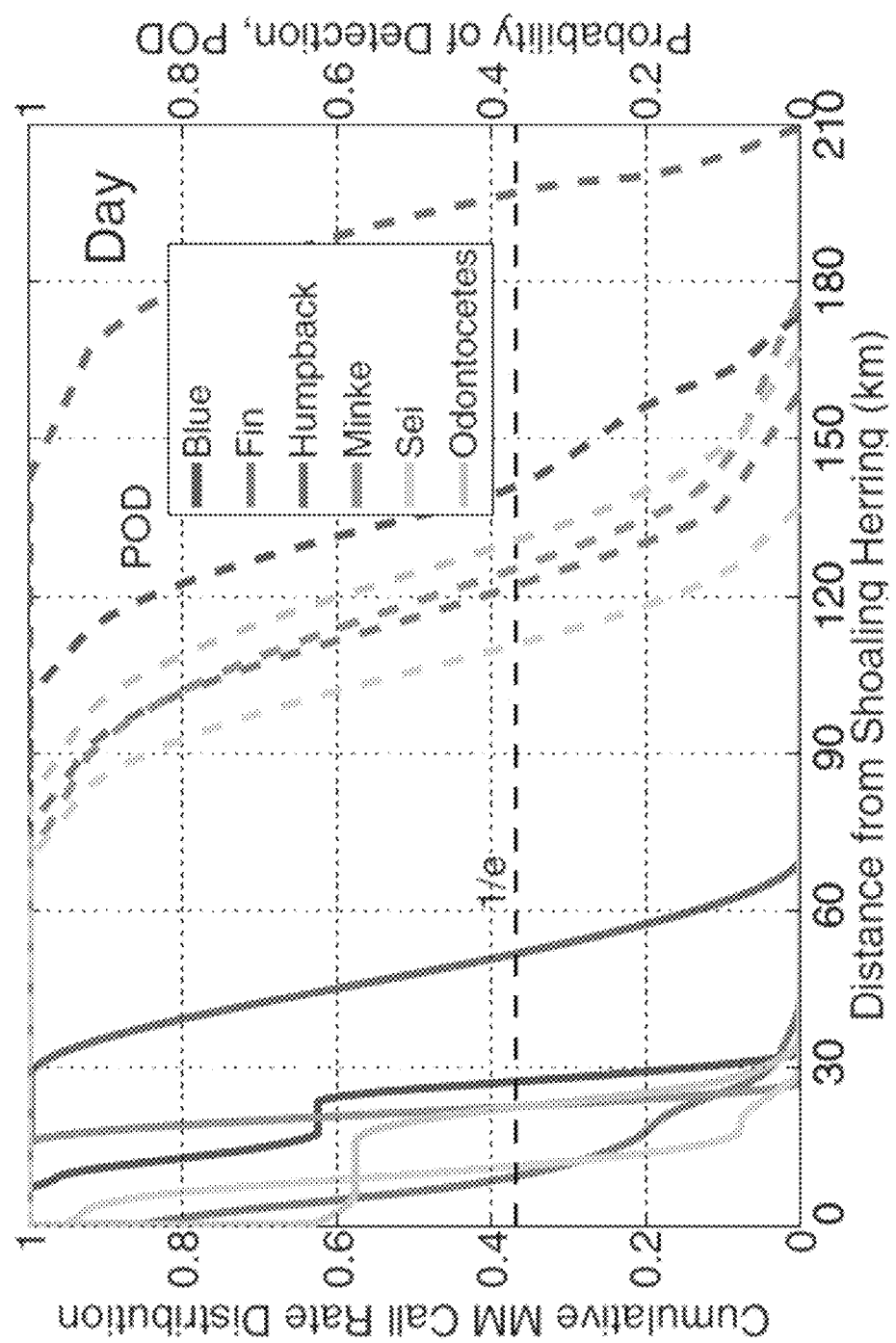
FIG. 10 depicts cumulative diurnal marine mammal call rate distribution information generated according to some embodiments.

FIGS. 9A and 9B depict a marine mammal detection region and cumulative nocturnal marine mammal call rate distribution based on information generated according to some embodiments. FIG. 9A illustrates a probability of detection (POD) contour for marine mammal vocalizations. Area 915 of FIG. 9A generally coincides with a region of a marine environment depicted in FIGS. 3A-3C. FIG. 9B depicts cumulative nocturnal marine mammal vocalization rate distributions as a function of a minimum distance from nocturnal herring shoaling errors. The e-folding distances 920 of the cumulative nocturnal marine mammal vocalization rate distributions may range from about 0 to about 8 km, depending on the species. In an azimuthally-averaged POAWRS marine mammal POD e-folding distances from nocturnal herring shoaling areas may be a factor of 10 to 100 times larger. FIGS. 9C-9H depict probability of detection contours based on information generated via a marine animal monitoring system according to some embodiments. In some embodiments, the e-folding decay range of the cumulative call rate distribution for each marine mammal species is the distance from herring shoals where the cumulative call rate distribution decays to 1/e=0.37, such that 63% of vocalizations from that species are contained within the e-folding decay range FIG. 10 depicts cumulative diurnal marine mammal call rate distribution information generated according to some embodiments. More specifically, FIG. 10 depicts cumulative diurnal marine mammal vocalization rate distribution and azimuthally-averaged POAWRS marine mammal POD as a function of minimum distance from diurnal shoaling areas. FIGS. 11A-11D depict diel marine mammal call rate and herring shoal areal population density time series based on information obtained from a marine animal monitoring system according to some embodiments. As shown in FIGS. 11A-11D, the marine animal monitoring system may operate to generate information depicting that the mean call rates for certain whale species may be correlated with Atlantic herring shoal mean areal population density over a diel cycle.

FIG. 12 depicts temporal connection information between marine mammals (MM) and fish shoaling populations based on information generated via a marine animal monitoring system configured according to some embodiments. More specifically, FIG. 12 depicts correlated marine mammal vocalization rate series with a herring shoaling areal population density time series over a diel cycle as a function of marine mammal species. For example, FIG. 12 depicts a temporal correlation $r_{MM,fish}$ of a MM vocalization time series to a fish shoaling areal population density time series, as well as temporal correlation $r_{MMI,MMII}$ between distinct MM species (for instance, species MMI and species MMII) vocalization rate time series over the diel cycle. In some embodiments, temporal correlation $r_{MM,fish}$ May be Calculated as Follows:

$$r_{MM,fish} = \frac{\sum_{k=1}^{N}(c_{MM}(t_k) - \overline{c_{MM}})(n_{fish}(t_k) - \overline{n_{fish}})}{\sqrt{(c_{MM}(t_k) - \overline{c_{MM}})^2}\sqrt{(n_{fish}(t_k) - \overline{n_{fish}})^2}},$$

where the degree of similarity between diel MM call rate series $C_{MM}(t_k)$ and the diel fish areal population density time series $n_{fish}(t_k)$ may be calculated using measurements $c_{MM}(t_k)$ and $c_{MM}(t_{kj})$ that are independent for j≠k, so that $t_{k+1}-t_k=1.25$ h.

In some embodiments, temporal correlation $r_{MMI,MMII}$ may be calculated as follows:

$$r_{MM,fish} = \frac{\sum_{k=1}^{N}(c_{MMI}(t_k) - \overline{c_{MMI}})(c_{MMII}(t_k) - \overline{c_{MMII}})}{\sqrt{(c_{MMI}(t_k) - \overline{c_{MMI}})^2}\sqrt{(c_{MMII}(t_k) - \overline{c_{MMII}})^2}},$$

where the degree of similarity between diel MMI call rate series $c_{MMI}(t_k)$ and the diel MMII call rate series $c_{MMII}(t_k)$ may be calculated using measurements $c_{MMI}(t_k)$ and $c_{MMII}(t_{kj})$ that are independent for j≠k, so that $t_{k+1}-t_k=1.25$ h.

In some embodiments, a detectable marine mammal vocalization occurrence, such as a humpback whale song occurrence, for an acoustic receiver array configured according to some embodiments may be quantified in terms of local wind-speed dependent ambient noise for a given spatial distribution of vocalizing marine mammals (for example, humpback whales). The marine mammal vocalization occurrence may depend on the presence of at least one vocalizing marine mammal inside a mean wind-dependent detection range of the acoustic receiver array. The percentage of time in a day over which a marine mammal is within the mean detection area and is vocalizing corresponds to the measured daily marine mammal vocalization occurrence rate.

In various embodiments, the detection range, $r_d$, may be the range from a center of an array at which signals, for example marine mammal vocalizations such as humpback whale songs, can no longer be detected above ambient noise. In some embodiments, the detection range may be determined according to the following:

$$NL(v)+DT-AG=(RL(r_d(v))=SL-TL(r_d(v)),$$

Where NL(v) is the wind-speed-dependent ambient noise level, v is the wind speed, DT is the detection threshold, RL is the received sound pressure level due to a marine mammal vocalization (for instance, a humpback whale song) source level SL undergoing a transmission loss of $TL(r_d(v))$ at range $r_d(v)$ for some given source and receiver depth(s), and AG is the array gain equal to $10 \log_{10} N_0$ for an acoustic receiver array, where $N_0$ is the number of coherent sensors spaced at half wavelength. In some embodiments, DT was set such that the sum of signal and noise may be detectable at least 5.6 dB above the noise. The ambient noise and the received signal are filtered to the frequency band of the source In some embodiments, wind-speed-dependent ambient noise level may be modeled according to the following:

$$NL(v) = 10\log_{10}\left(\frac{av^n + \beta}{1 \mu Pa^2}\right),$$

where n is the power is the power law coefficient of wind-speed-dependent ambient noise, α is the waveguide propagation factor, and β corresponds to the constant baseline sound pressure squared in the frequency band of the source. In some embodiments, may have various values, for example, n≈1.0, n≈1.2, n≈2.0, n≈3.0, and value and ranges between any two of these values (including endpoints).

In some embodiments, the marine animal monitoring system may be configured to generate a POD PD(r) of the marine mammal vocalizations from each species as a function of range r from the POAWRS acoustic receiver array according to some embodiments, for example, based on the information depicted in FIGS. 9A-9H, 10, and 12. For a marine mammal at range r from the acoustic receiver array, a vocalization signal may be detected above the ambient noise if the following sonar equation is satisfied:

$$NL+DT-AG<L_S-DT(r),$$

where $L_S$ is the marine mammal vocalization source level, NL is the ambient noise level in the frequency band of the marine mammal vocalization signal, AG is the coherent beamforming gain of our passive receiver array, DT is the detection threshold, and TL is the broadband transmission loss.

In some embodiments, a parabolic equation based Range-dependent Acoustic propagation model (RAM) may be used to generate the broadband transmission loss via the following:

$$TL=10 \log_{10}(\int_{f_L}^{f_U} Q(f) < |G(r|r_0,f)|^2 > df),$$

where $G(r|r_0,f)$ is the waveguide Green function for marine mammal source located at $r_0$ and receiver at r, Q(f) is the normalized marine mammal vocalization spectra, and $f_L$ and $f_U$ are the lower and upper frequencies, respectfully, of the analysis. The POD model according to some embodiments may take into account the environmental parameters, such as the range dependent bathymetry, seafloor geo-acoustic properties, marine mammal source and acoustic receiver array location, and over 200 experimentally measured water-column sound speed profiles to stochastically compute the propagated acoustic intensities via Monte-Carlo simulation using various techniques.

The marine mammal vocalizations may be detected from the beamformed spectrograms generated according to some embodiments. The marine mammal vocalizations may occupy about M number of independent time-frequency pixels $\Delta f \Delta t$ where M may vary between 3 to 24 depending on species. In some embodiments, a detection probability $p_{D,1}(r)$ in a single frequency-time pixel may be determined based on the following:

$$p_{D,1}(r) = \int_{-\infty}^{+\infty} fL_R(L_R(r)) \int_{-\infty}^{+\infty} fL_N(L_N) dL_N dL_R),$$

where $fL_N(L_N)$ is the probability density function of the log-transformed ambient noise pressure-squared $L_N(t,f)=10 \log_{10}(|P_N(t,f)/P_{ref}|^2 > df)=S_N(t,f)+10 \log_{10}(\Delta f)-AG$ within a single beamformed spectrogram time frequency pixel in the frequency range of the marine mammal vocalization; $P_N(t,f)$ is the noise pressure at time t within frequency bin $\Delta f$ centered at frequency f and $S_N(t,f)$ is the omnidirectional ambient noise spectral density level; $fL_R$ ($L_R$ (r)) is the probability density function of the received marine mammal vocalization signal log-transformed pressure squared $$L_R(r | t, f) = 10 \log_{10}(|P_R(t, f) / P_{ref}|^2) = L_S - TL(r) + 10\log_{10}\frac{\Delta f}{B(t)}$$

within a single beam-formed spectrogram time-frequency pixel, where $P_R(t,f)$ is the received marine mammal vocalization signal pressure, and B(t) is the instantaneous bandwidth at time t.

In some embodiments, the number of independent beamformed spectrogram frequency-time pixels occupied by the marine mammal vocalization signal may be related to the instantaneous bandwidth via $M\Delta f \Delta t = \tau B(t)$, where $\tau$ is the signal duration. In various embodiments, an exponential-Gamma distribution may be used to generate the log-transformed ambient noise pressure-squared and log-transformed received marine mammal pressure-squared within a single beamformed spectrogram time-frequency pixel according to the following:

$$fL_N(L_N) = \frac{1}{(10\log_{10}e)\Gamma(\mu)} \left(\frac{\mu}{\langle P_N^2 \rangle}\right)^\mu 10^{\mu \frac{L_N}{10}} \exp\left(-\mu \frac{10^{\frac{L_N}{10}}}{\langle P_N^2 \rangle}\right), \text{ and}$$

$$fL_R(L_R(r)) = \frac{1}{(10\log_{10}e)\Gamma(\mu)} \left(\frac{\mu}{\langle P_R^2(r) \rangle}\right)^\mu 10^{\mu L_R(r)/10} \exp\left(-\mu \frac{10^{\frac{L_R(r)}{10}}}{\langle P_N^2 \rangle}\right),$$

where $\mu$ is the time-bandwidth product or number of statistically independent fluctuations of the respective pressure-squared quantities. Since the beamformed spectrograms have time-frequency pixels that satisfy $\Delta f \Delta t=1$, both the ambient noise level and the received marine mammal vocalization signal level within each beamformed spectrogram time-frequency pixel can be treated as instantaneous with time-bandwidth product $\mu=1$ and 5.6 dB standard deviation.

The overall POD, PD(r), for the marine mammal vocalizations from each species as a function of range r from the acoustic receiver array may be determined from a Gaussian approximation to the binomial cumulative distribution function (CDF) as follows:

$$PD(r) = 1 - \Phi\left(\frac{0.3M - Mp_{D,1}(r)}{\sqrt{Mp_{D,1}(r)(1 - p_{D,1}(r))}}\right),$$

$$\text{where } \Phi(z) = \frac{1}{\sqrt{2\pi}} \int_{-\infty}^{z} e^{-u^2/du}.$$

FIG. 9B depicts POD PD(r) for various species of marine mammals generated based on various embodiments. More specifically, FIG. 9B depicts azimuthally-dependent POAWRS marine mammal vocalization probability detection contours for diverse whale species.

In some embodiments, in regions where the probability of detection (POD) is low, for example, due to unfavorable transmission, the marine animal monitoring system may have a lower probability of detecting acoustic signals from marine animals (such as marine mammal vocalizations. When the POD is high, for example, due to favorable transmission and no detections, substantially no detections are made, there is high confidence that no vocalizing MMs are present. In some embodiments, a low POD may be a POD below about 20%, below about 30%, below about 40%, below about 50%, below about 60%, below about 70%, below about 80%, below about 90%, below about 95%, below about 98%, and any value or range between any two of these values (including endpoints). In some embodiments, a high POD may be a POD above about 20%, above about 30%, above about 40%, above about 50%, above about 60%, above about 70%, above about 80%, above about 90%, above about 95%, above about 98%, and any value or range between any two of these values (including endpoints).

In some embodiments, the marine mammal vocalization source levels $L_S$ may include values estimated from a subset of the marine mammal vocalizations received at the acoustic receiver array. In some embodiments, $L_S$ may have units of dB re 1 µPa at 1 m and may have different values for different whale species, for example, 189±5.6 for blue and fin, 180±5.6 for humpback, 179±5.6 for sei, 179±5.6 for minke, and 165±5.6 for odontocete (for instance, for downsweep chirp signals). In various embodiments, the omnidirectional ambient noise spectral density levels $S_n(f)$ may be estimated directly from the information detected by the acoustic receiver array, for example, using segments that are devoid of marine mammal vocalizations. In some embodiments, $S_n(f)$ may have units of dB re 1 µPa/Hz at 1 m and may have different values for different whale species, for example, 80±5.6 for fin, 76±5.6 for blue and sei, 64±5.6 for humpback, 69±5.6 for minke, and 50±5.6 for odontocete.

Components may be communicatively coupled to each other by various types of communications media to coordinate operations. The coordination may involve the unidirectional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces and bus interfaces.

Figure 13A:
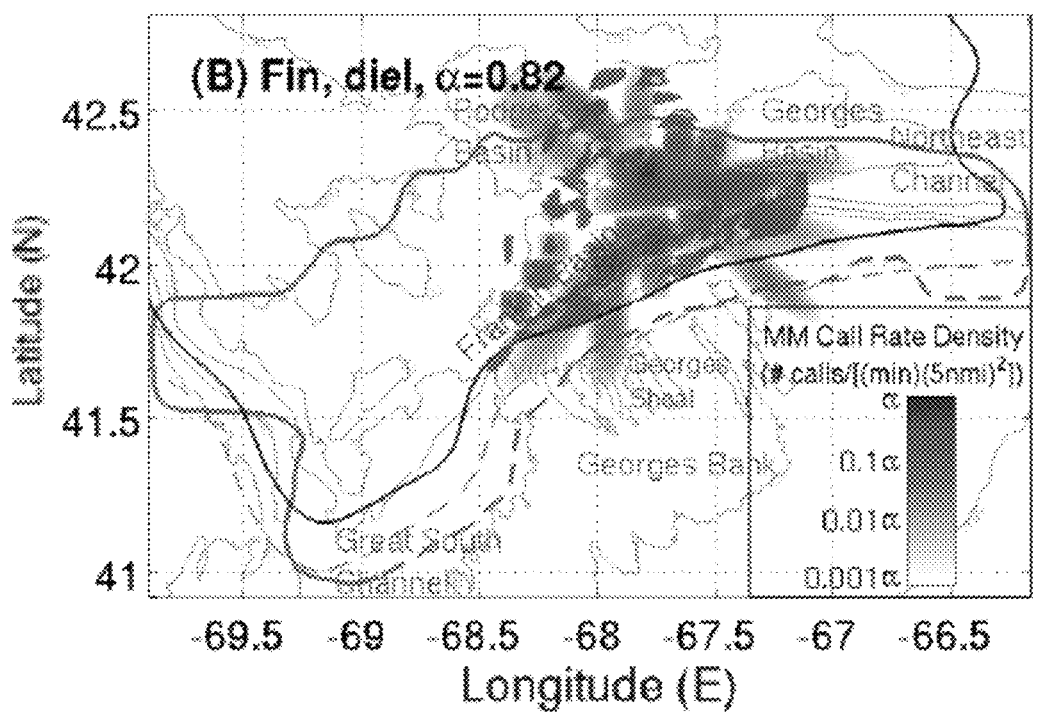
FIG. 13A depicts a full diel cycle vocalization rate special distribution for a marine mammal according to some embodiments.
Figure 13B:
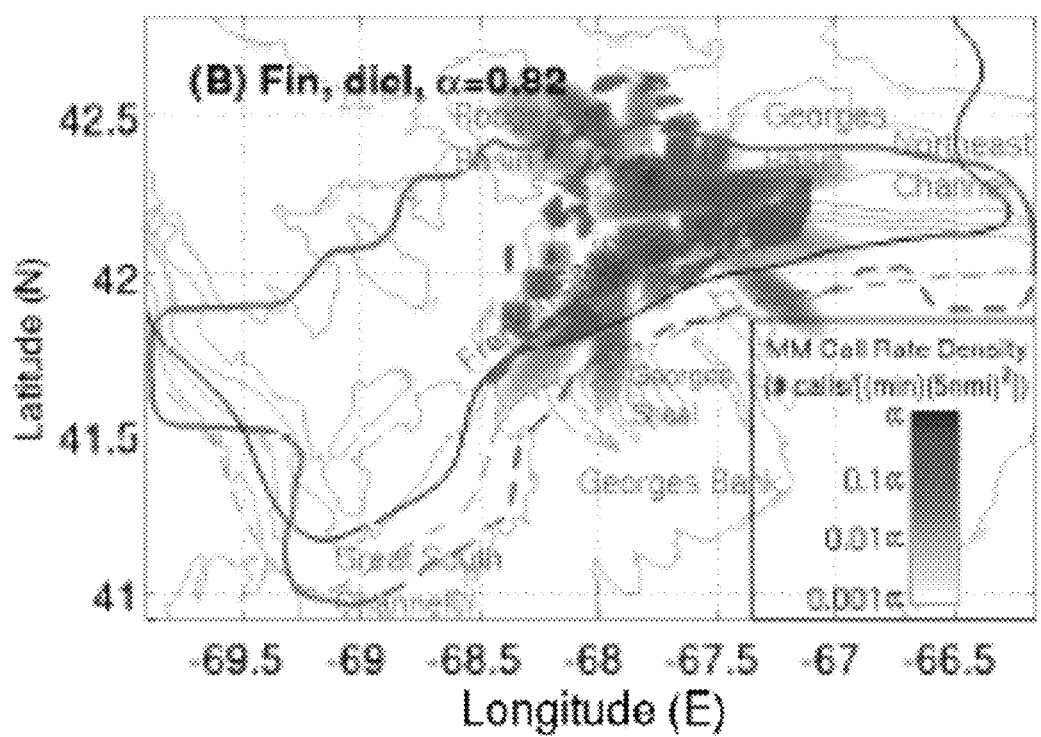
FIG. 13B depicts a normalized full diel cycle vocalization rate special distribution for a marine mammal according to some embodiments.

FIG. 13A depicts a full diel cycle vocalization rate special distribution for a marine mammal based on information and processes according to some embodiments. As shown in FIG. 13A, dense herring shoals 1305 and diffuse herring populations 1310 may be determined according to some embodiments, including using an OAWRS system. Marine mammal vocalization densities 1315, 1320, and 1325 may be determined and/or modeled using marine animal information and processes according to some embodiments. For instance, a marine mammal vocalization POD of 0.8 and 0.2 may be indicated for a species of marine mammal. FIG. 13B depicts POD-normalized full diel cycle vocalization rate special distribution for a marine mammal based on information and processes according to some embodiments. As shown in FIG. 13B, call rate densities may be normalized by dividing the call rate density by POD at a particular location.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies and so forth. The embodiments, however, are not limited to implementation by the computing architecture 1300.

Figure 14:
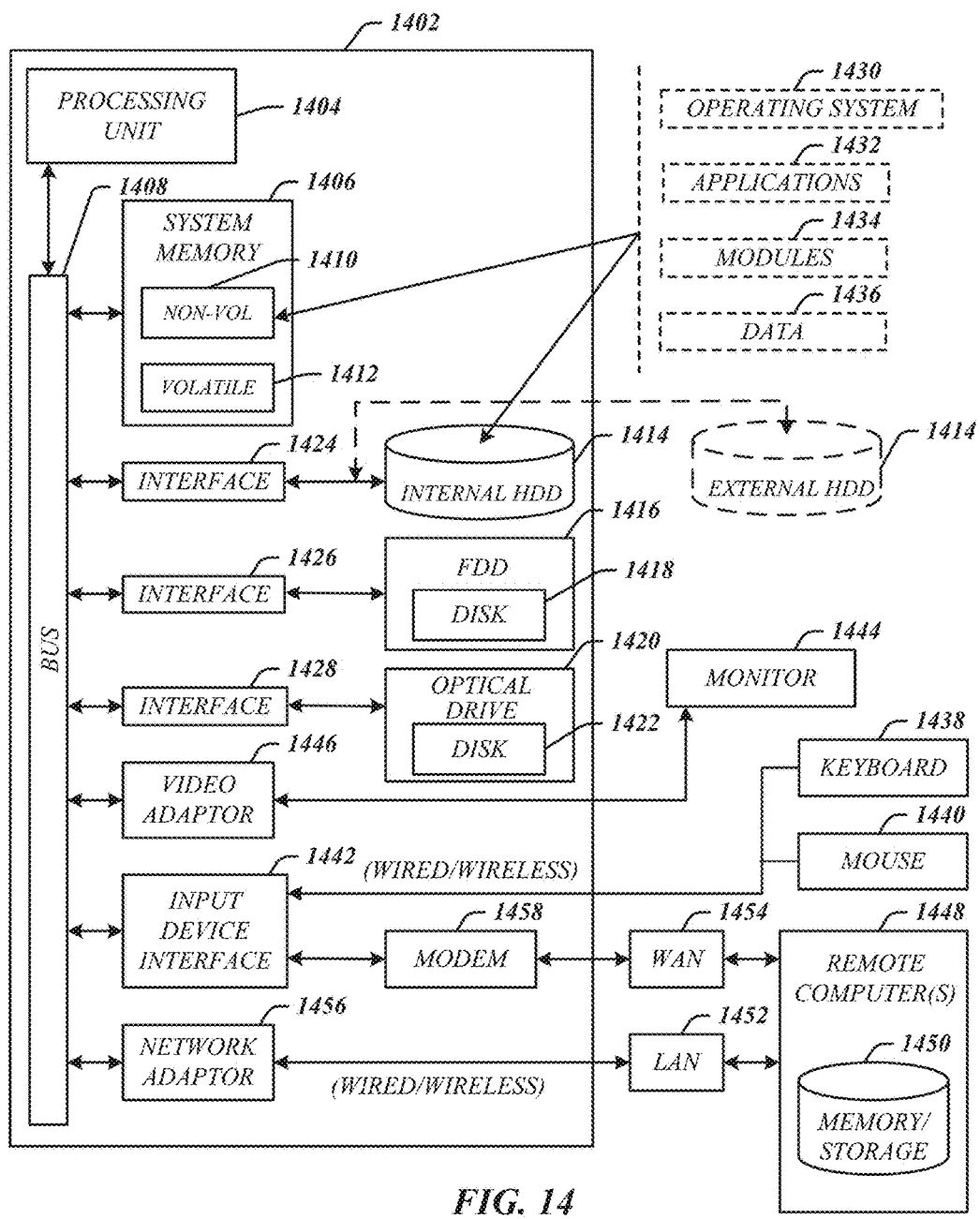
FIG. 14 illustrates an exemplary embodiment of a computing architecture.

As shown in FIG. 14, the computing architecture 1400 comprises a processing unit 1404, a system memory 1406 and a system bus 1408. The processing unit 1404 can be any of various commercially available processors. Processing unit 1404 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing unit 1404 may be connected to and communicate with the other elements of the computing system via an interconnect. Further, processing unit 1404 may include other components, such as an uncore component including logic to process information, instructions and so forth not essential to core processing.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA) and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory and so forth. Examples of logic may include executable computer program instructions implemented using any suitable type of code, such as source code, compiled code, interpreted code, executable code, static code, dynamic code, object-oriented code, visual code and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418 and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 794 interface technologies.

The drives and associated computer-readable media provide volatile and/or nonvolatile storage of data, data structures, computer-executable instructions and so forth. For example, a number of program modules can be stored in the drives, non-volatile memory 1410 and volatile memory 1412, including an operating system 1430, one or more application programs 1432, other program modules 1434 and program data 1436. In one embodiment, the one or more application programs 1432, other program modules 1434 and program data 1436 can include, for example, the various applications and/or components of the marine animal monitoring system.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses and the like. These and other input devices are often connected to the processing unit 1404 through an input device interface 1442 that is coupled to the system bus 1408, but can be connected by other interfaces such as a parallel port, IEEE 894 serial port, a game port, a USB port, an IR interface and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus for monitoring a plurality of marine animals, comprising:
   an acoustic receiver array comprising a plurality of hydrophone elements in a coherent horizontal line-array arranged in a plurality of sub-apertures for spatially unaliased and temporally unaliased sensing of acoustic signals within a marine environment, the acoustic receiver array having a gain of $10 \log_{10} n=18$ dB, where n=64 hydrophones for each of the plurality of sub-apertures.

2. The apparatus of claim 1, the plurality of hydrophone elements comprising 160 hydrophones.

3. The apparatus of claim 1, the plurality of sub-apertures comprising 4 sub-apertures, each sub-aperture comprising 64 hydrophones.

4. The apparatus of claim 1, the acoustic receiver array to sense acoustic signals up to about 4 kHz.

5. The apparatus of claim 1, the plurality of hydrophone elements spanning a frequency range from below about 50 Hz to about 3750 Hz.

6. The apparatus of claim 1, the acoustic receiver array to sense acoustic signals over a marine environment of about 50,000 km² to about 100,000 km².

7. The apparatus of claim 1, the plurality of hydrophone elements comprising a coherent hydrophone array.

8. The apparatus of claim 1, the plurality of sub-apertures comprising a low-frequency sub-aperture for sensing acoustic signals below about 500 Hz and a mid-frequency sub-aperture for sensing acoustic signals from above about 500 Hz to about 1000 Hz.

9. The apparatus of claim 1, the plurality of marine animals comprising at least one of marine mammals and fish.

10. The apparatus of claim 9, the acoustic signals comprising at least one of marine mammal vocalizations and fish acoustic signals.

11. The apparatus of claim 1, the acoustic receiver array providing a sensing capacity via coherent beamforming.

12. A system for monitoring a plurality of marine animals, comprising:
   at least one processor circuit;
   and a memory unit coupled to the at least one processor circuit, the memory unit to store one or more programming instructions that, when executed, cause the processor to:
     receive acoustic signal information from an acoustic receiver array comprising a plurality of hydrophone elements in a coherent horizontal line-array arranged in a plurality of sub-apertures for spatially unaliased and temporally unaliased sensing of acoustic signals within a marine environment,
     transform the acoustic signal information into marine animal information,
     generate a probability of detection of at least one species of the plurality of marine animals,
     generate at least one acoustic pressure-time series based on the acoustic signal information,
     transform the acoustic signal information into at least one two-dimensional beam-time series, and
     perform time-domain beamforming on the acoustic signal information to generate the two-dimensional beam-time series.

13. The system of claim 12, the marine animal information comprising at least one of location information, spatial information, bearing information, species information, population information, call type information, probability of detection information.

14. The system of claim 12, the one or more programming instructions, when executed, cause the processor to generate at least one spectrogram based on the acoustic signal information using temporal Fourier transform.

15. The system of claim 12, at least a portion of the acoustic signals comprising at least one of marine mammal vocalizations and fish acoustic signals.

16. The system of claim 12, the acoustic receiver array providing a sensing capacity via coherent beamforming.

* * * * *